US010670273B2

(12) United States Patent
Propheter-Hinckley et al.

(10) Patent No.: US 10,670,273 B2
(45) Date of Patent: Jun. 2, 2020

(54) COOLING CONFIGURATIONS FOR COMBUSTOR ATTACHMENT FEATURES

(71) Applicant: UNITED TECHNOLOGIES CORPORATION, Farmington, CT (US)

(72) Inventors: Tracy A Propheter-Hinckley, Manchester, CT (US); Benjamin D Bellows, Glastonbury, CT (US); Brandon W Spangler, Vernon, CT (US); David J Hyland, Portland, CT (US); Dennis M Moura, South Windsor, CT (US); Dustin W Davis, Marlborough, CT (US); Mark F Zelesky, Bolton, CT (US); Ricardo Trindade, Mansfield, CT (US); Steven Bruce Gautschi, Milton, MA (US); Trevor Rudy, Morgantown, WV (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 189 days.

(21) Appl. No.: 15/698,967

(22) Filed: Sep. 8, 2017

(65) Prior Publication Data

US 2019/0078785 A1    Mar. 14, 2019

(51) Int. Cl.
*F23R 3/60*  (2006.01)
*F23R 3/00*  (2006.01)
(Continued)

(52) U.S. Cl.
CPC ............... *F23R 3/60* (2013.01); *F23R 3/002* (2013.01); *F23R 3/06* (2013.01); *F23R 3/54* (2013.01);
(Continued)

(58) Field of Classification Search
None
See application file for complete search history.

(56) References Cited

U.S. PATENT DOCUMENTS

| 4,423,000 A | 12/1983 | Dierberger |
| 4,749,298 A | 6/1988 | Bundt et al. |

(Continued)

FOREIGN PATENT DOCUMENTS

| CN | 202418 76 | 9/2012 |
| EP | 1389690 | 2/2004 |

(Continued)

OTHER PUBLICATIONS

European Patent Office, European Search Report dated May 8, 2019 in Application No. 18192830.0.

(Continued)

*Primary Examiner* — Todd E Manahan
*Assistant Examiner* — Rodolphe Andre Chabreyrie
(74) *Attorney, Agent, or Firm* — Snell & Wilmer L.L.P.

(57) ABSTRACT

A combustor panel may include an attachment feature. Because conventional attachment features of conventional combustor panels may be insufficiently cooled, the present disclosure provides various combustor configurations for reducing hotspots in the vicinity of attachment features and/or for providing cooling airflow to and in the vicinity of attachment features.

13 Claims, 18 Drawing Sheets

(51) Int. Cl.
*F23R 3/06* (2006.01)
*F23R 3/54* (2006.01)

(52) U.S. Cl.
CPC .............. *F23R 2900/03041* (2013.01); *F23R 2900/03042* (2013.01); *F23R 2900/03043* (2013.01); *F23R 2900/03044* (2013.01)

(56) References Cited

U.S. PATENT DOCUMENTS

| | | | | |
|---|---|---|---|---|
| 4,820,097 | A | * | 4/1989 | Maeda ................ F02K 1/80 165/134.1 |
| 5,019,079 | A | * | 5/1991 | Ross .................. A61B 17/863 411/389 |
| 6,467,988 | B1 | | 10/2002 | Czachor |
| 6,718,774 | B2 | | 4/2004 | Razzell |
| 9,518,737 | B2 | | 12/2016 | Pidcock et al. |
| 9,644,843 | B2 | | 5/2017 | Herborth |
| 10,151,486 | B2 | * | 12/2018 | Sandoval ............... F23R 3/045 |
| 10,247,419 | B2 | * | 4/2019 | Slavens .................. F23R 3/06 |
| 2003/0123953 | A1 | * | 7/2003 | Razzell ............... F01D 25/243 411/419 |
| 2004/0093872 | A1 | | 5/2004 | Tiemann |
| 2007/0280822 | A1 | * | 12/2007 | Frost .................... F02K 1/80 415/170.1 |
| 2008/0115506 | A1 | | 5/2008 | Patel et al. |
| 2010/0263386 | A1 | | 10/2010 | Edwards |
| 2011/0011095 | A1 | | 1/2011 | Ladd et al. |
| 2013/0117996 | A1 | * | 5/2013 | Ducornait ........... F16B 37/0842 29/525.02 |
| 2014/0096527 | A1 | | 4/2014 | Bangerter |
| 2014/0130501 | A1 | | 5/2014 | Clemen |
| 2014/0190166 | A1 | * | 7/2014 | Pidcock .................. F23R 3/002 60/722 |
| 2014/0252198 | A1 | | 9/2014 | Johnston, Jr. |
| 2015/0096302 | A1 | * | 4/2015 | Herborth ............... F23R 3/002 60/752 |
| 2015/0128602 | A1 | | 5/2015 | Clemen |
| 2015/0135719 | A1 | | 5/2015 | Gerendas |
| 2015/0260400 | A1 | | 9/2015 | Clemen |
| 2015/0285496 | A1 | * | 10/2015 | Grendel .................. F23M 5/04 60/753 |
| 2015/0345789 | A1 | | 12/2015 | Papple et al. |
| 2016/0265772 | A1 | | 9/2016 | Eastwood |
| 2016/0265775 | A1 | | 9/2016 | Cunha |
| 2016/0273770 | A1 | * | 9/2016 | Hanson .................. F23R 3/06 |
| 2016/0313004 | A1 | * | 10/2016 | Chang ................... F23R 3/007 |
| 2016/0313005 | A1 | * | 10/2016 | Chang ................... F23R 3/002 |
| 2017/0067642 | A1 | | 3/2017 | Szarvasy et al. |
| 2017/0205069 | A1 | * | 7/2017 | Tentorio ................ F23R 3/002 |
| 2018/0283691 | A1 | * | 10/2018 | Corsmeier ............... F02C 7/32 |
| 2018/0292089 | A1 | * | 10/2018 | Porter .................... F23R 3/002 |

FOREIGN PATENT DOCUMENTS

| | | | |
|---|---|---|---|
| EP | 2743585 | | 6/2014 |
| EP | 2918915 | | 9/2015 |
| EP | 3009744 | | 4/2016 |
| EP | 3086041 | | 10/2016 |
| GB | 2356041 | | 5/2001 |
| WO | 2015017180 | | 2/2015 |
| WO | 2015-302892 | * | 5/2015 ............... F23R 3/06 |
| WO | 2015069466 | | 5/2015 |

OTHER PUBLICATIONS

USPTO, Non-Final Office Action dated Jun. 10, 2019 in U.S. Appl. No. 15/699,838.
USPTO, Restriction/Election Requirement dated Jun. 10, 2019 in U.S. Appl. No. 15/699,163.
USPTO, Restriction/Election Requirement dated Jun. 10, 2019 in U.S. Appl. No. 15/699,514.
USPTO, Restriction/Election Requirement dated Jun. 10, 2019 in U.S. Appl. No. 15/699,648.
European Patent Office, European Search Report dated Feb. 13, 2019 in Application No. 18192574.4.
European Patent Office, European Search Report dated Feb. 7, 2019 in Application No. 18192830.0.
European Patent Office, European Search Report dated Feb. 13, 2019 in Application No. 18192789.8.
European Patent Office, European Search Report dated Nov. 20, 2018 in Application No. 18192784.9.
European Patent Office, European Search Report dated Dec. 3, 2018 in Application No. 18192778.1.
Tracy A. Propheter-Hinckley et al., U.S. Appl. No. 15/699,163, filed Sep. 8, 2017 entitled "Cooling Configurations for Combustor Attachment Features".
Bellows et al., U.S. Appl. No. 15/699,514, filed Sep. 8, 2017 entitled "Cooling Configurations for Combustor Attachment Features".
Tracy A. Propheter-Hinckley et al., U.S. Appl. No. 15/699,648, filed Sep. 8, 2017 entitled "Cooling Configurations for Combustor Attachment Features".
Jonathan Lemoine et al., U.S. Appl. No. 15/699,838, filed Sep. 8, 2017 entitled "Cooling Configurations for Combustor Attachment Features".
USPTO, Non-Final Rejection dated Sep. 4, 2019 in U.S. Appl. No. 15/699,514.
USPTO, Non-Final Rejection dated Sep. 3, 2019 in U.S. Appl. No. 15/699,163.
USPTO, Non-Final Office Action dated Oct. 3, 2019 in U.S. Appl. No. 15/699,648.
USPTO, Notice of Allowance dated Nov. 27, 2019 in U.S. Appl. No. 15/699,838.
USPTO, Corrected Notice of Allowance dated Mar. 5, 2020 in U.S. Appl. No. 15/699,838.
USPTO, Notice of Allowance dated Mar. 18, 2020 in U.S. Appl. No. 15/699,648.
USPTO, Final Office Action dated Mar. 23, 2020 in U.S. Appl. No. 15/699,163.
USPTO, Notice of Allowance dated Mar. 24, 2020 in U.S. Appl. No. 15/699,514.

* cited by examiner

COOLING CONFIGURATIONS FOR COMBUSTOR ATTACHMENT FEATURES

FIELD

The present disclosure relates to combustors, and more specifically, to providing cooling air to and around combustor attachment features.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

Combustors used in gas turbine engines generally rely on combustor panels, attached to a combustor shell, to interface with hot combustion gases and guide the combustion gases into the turbine. Combustor panel attachment features are generally utilized to couple the combustor panels to the combustor shell. However, conventional combustors often have reduced cooling airflow in the vicinity of the combustor panel attachment features, and thus such areas in the combustor may be susceptible to structural damage and/or oxidation caused by the high temperature of the combustion gases.

SUMMARY

In various embodiments, the present disclosure provides a combustor panel that includes an attachment feature. The attachment feature includes a central longitudinal axis and the attachment feature extends from a cold side of the combustor panel, according to various embodiments. The attachment feature may define a core passage extending from an inlet opening partially through the attachment feature substantially parallel to the central longitudinal axis. The attachment feature may also define an offshoot passage extending from the core passage to an outlet opening.

In various embodiments, the attachment feature includes a tip portion and a base portion. The attachment feature may be configured to extend through a combustor shell such that the tip portion is disposed outward of a diffuser-facing side of the combustor shell. The base portion may be configured to be disposed between the cold side of the combustor panel and the diffuser-facing side of the combustor shell. In various embodiments, the inlet opening is defined on the tip portion such that the core passage extends from the inlet opening and terminates within the attachment feature. In various embodiments, the outlet opening is defined on the base portion.

The attachment feature may be integrally formed with the combustor panel. The core passage may be coaxial with the central longitudinal axis. In various embodiments, the offshoot passage is one offshoot passage of a plurality of offshoot passages. The plurality of offshoot passages may be circumferentially distributed and extend radially, relative to the central longitudinal axis of the attachment feature, from the core passage.

Also disclosed herein, according to various embodiments, is a combustor panel that includes an attachment feature having a central longitudinal axis. The attachment feature extends from a cold side of the combustor panel, according to various embodiments. The attachment feature may define a core passage extending from an inlet opening through the attachment feature substantially parallel to the central longitudinal axis. A network of cooling passages may also be defined in the combustor panel, wherein the network of cooling passages extends from the core passage to a hot side of the combustor panel to deliver effusion cooling to the hot side of the combustor panel.

In various embodiments, the combustor panel includes a plurality of standoffs extending from the cold side of the combustor panel. The plurality of standoffs may be distributed circumferentially around the attachment feature, and the network of cooling passages may be substantially confined within a footprint of the plurality of standoffs. In various embodiments, the core passage is the exclusive source of cooling airflow to the network of cooling passages. In various embodiments, the network of cooling passages includes a plurality of effusion outlets defined on the hot side of the combustor panel. The effusion orientation of the plurality of effusion outlets may be uniform.

Also disclosed herein, according to various embodiments, is a combustor panel that includes an attachment feature with a central longitudinal axis. The attachment feature extends from a cold side of the combustor panel, according to various embodiments, and the attachment feature may include a peripheral channel defined on a peripheral surface of the attachment feature. The peripheral channel may extend partially along a length of the attachment feature. In various embodiments, the peripheral channel is one of a plurality of peripheral channels, wherein the plurality of peripheral channels are circumferentially distributed around the peripheral surface of the attachment feature. In various embodiments, the plurality of peripheral channels includes six (6) peripheral channels. In various embodiments, the peripheral surface includes threads, wherein threaded sections of the peripheral surface are interposed between adjacent peripheral channels of the plurality of peripheral channels.

In various embodiments, the attachment feature includes a tip portion and a base portion, wherein the attachment feature is configured to extend through a combustor shell such that the tip portion is disposed outward of a diffuser-facing side of the combustor shell. The base portion may be configured to be disposed between the cold side of the combustor panel and the diffuser-facing side of the combustor shell, and a nut may be configured to be engaged with the threads of the peripheral surface of the attachment feature. In various embodiments, the plurality of peripheral channels extends from a position outward of the nut in an installed position. In various embodiments, the plurality of peripheral channels is configured to deliver cooling airflow to a space defined between the attachment feature and the plurality of standoffs. In various embodiments, the plurality of peripheral channels extends substantially parallel to the central longitudinal axis of the attachment feature.

In various embodiments, the present disclosure provides a combustor of a gas turbine engine. The combustor may include a combustor panel having an attachment feature extending from a cold side of the combustor panel. The combustor may also include a combustor shell defining a hole extending through the combustor shell from a combustor-facing side to a diffuser-facing side, wherein the attachment feature of the combustor panel extends through the hole. In various embodiments, the combustor also includes a retention feature coupled to the attachment feature, wherein the hole defined in the combustor shell is disposed between the retention feature and the combustor panel. In various embodiments, the retention feature defines a passage that provides fluid communication between a diffuser chamber and an annular cooling cavity defined between the cold side of the combustor panel and the combustor-facing side of the combustor shell.

In various embodiments, the retention feature is a nut. The combustor may further include a washer disposed between the nut and the hole defined in the combustor shell. In various embodiments, an inner edge defining the hole is non-circular. For example, the inner edge may have a lobe aligned with the passage defined in the nut. The passage defined in the nut may be one of a plurality of passages defined in the nut, wherein the inner edge defining the hole comprises a lobed geometry having a plurality of lobes circumferentially distributed around the inner edge defining the hole, wherein the plurality of lobes are configured to align with the plurality of passages.

In various embodiments, the attachment feature includes a central longitudinal axis, and the passage extends substantially perpendicular to the central longitudinal axis through the retention feature. In various embodiments, a gap is disposed between an inner surface of the retention feature inward of the passage and a peripheral surface of the attachment feature, wherein the passage and the gap jointly provide fluid communication between a diffuser chamber and the annular cooling cavity.

Also disclosed herein, according to various embodiments, is a combustor of a gas turbine engine. The combustor may include a combustor panel comprising an attachment feature extending from a cold side of the combustor panel, wherein the attachment feature comprises a central longitudinal axis and a peripheral channel defined on a peripheral surface of the attachment feature. The combustor may also include a combustor shell defining a hole extending through the combustor shell from a combustor-facing side to a diffuser-facing side, wherein the attachment feature of the combustor panel extends through the hole, wherein an annular cooling cavity is defined between the cold side of the combustor panel and the combustor-facing side of the combustor shell. The combustor may also include a retention feature coupled to the attachment feature and defining a passage extending substantially perpendicular to the central longitudinal axis through the retention feature, wherein the hole defined in the combustor shell is disposed between the retention feature and the combustor panel. The peripheral channel and the passage jointly provide fluid communication between a diffuser chamber and the annular cooling cavity, according to various embodiments.

In various embodiments, the peripheral channel extends along a partial length of the attachment feature. In various embodiments, the attachment feature includes a tip portion and a base portion. The tip portion may be disposed outward of the diffuser-facing side of the combustor shell and the base portion may be disposed between the cold side of the combustor panel and the diffuser-facing side of the combustor shell. The peripheral channel may extend from the base portion to the tip portion.

In various embodiments, the peripheral channel terminates in the tip portion inward of an outward edge of the retention feature. In various embodiments, the peripheral channel terminates in the base portion inward of the combustor-facing side of the combustor shell. In various embodiments, the passage is a first passage is one of a plurality of passages defined in the retention feature, wherein the plurality of passages are circumferentially distributed around retention feature. The channel may be one of a plurality of peripheral channels and the plurality of peripheral channels are circumferentially distributed around the attachment feature. In various embodiments, the plurality of passages are configured to align with the plurality of retention features. In various embodiments, the retention feature includes a crenellated outward rim, wherein the plurality of passages correspond to respective notches in the crenellated outward rim, wherein the plurality of peripheral channels are configured to align the respective notches in the crenellated outward rim. In various embodiments, the passage is an archway formed in an inward rim of the retention feature. In various embodiments, the attachment feature is integrally formed with the combustor panel.

The present disclosure also provides, according to various embodiments, a combustor panel that includes an attachment feature having a central longitudinal axis and extending from a cold side of the combustor panel and a plurality of standoffs extending from the cold side of the combustor panel and disposed around the attachment feature. In various embodiments, a first height, as measured parallel to the central longitudinal axis from the cold side of the combustor panel, of a first standoff of the plurality of standoffs is different than a second height, also measured parallel to the central longitudinal axis from the cold side of the combustor panel, of a second standoff of the plurality of standoffs.

In various embodiments, the first height of the first standoff is less than the second height of the second standoff. For example, the first height may be between about 25% and about 75% of the second height, or the first height may be about 50% of the second height. In various embodiments, the first standoff is one of a first grouping of standoffs of the plurality of standoffs having the first height and the second standoff is one of a second grouping of standoffs of the plurality of standoffs having the second height. The plurality of standoffs are distributed circumferentially around the attachment feature, wherein each first standoff of the first grouping of standoffs is circumferentially adjacent respective second standoffs of the second grouping of standoffs and wherein each second standoff of the second grouping of standoffs is circumferentially adjacent respective first standoffs of the first grouping of standoffs, according to various embodiments.

In various embodiments, a standoff effusion hole is defined in at least one first standoff of the first grouping of standoffs. Each first standoff of the first grouping of standoffs may define at least one standoff effusion hole. Each second standoff of the second grouping of standoffs may be solid material throughout.

Also disclosed herein, according to various embodiments, is a combustor panel that includes a rail extending from and at least partially along a cold side of the combustor panel and an attachment feature having a central longitudinal axis and extending from the rail.

In various embodiments, the rail extends along a border of the combustor panel. In various embodiments, the attachment feature is a first attachment feature of a plurality of attachment features, wherein all of the attachment features of the plurality of attachment features of the combustor panel extend from a border rail of the combustor panel. In various embodiments, the rail is a first rail and the combustor panel further comprises a second rail extending from and at least partially along the cold side of the combustor panel, wherein the first rail and the second rail intersect at an intersection location, wherein the attachment feature extends from both the first rail and the second rail at the intersection location. In various embodiments, the intersection location is at a corner border of the combustor panel.

Also disclosed herein, according to various embodiments, is a combustor panel that includes a rail extending from and at least partially along a cold side of the combustor panel. The combustor panel may also include a first attachment feature extending from the rail, a second attachment feature extending from the cold side of the combustor panel, and a plurality of standoffs extending from the cold side of the combustor panel and disposed around the second attachment feature. In various embodiments, a first height, as measured from the cold side of the combustor panel, of a first standoff of the plurality of standoffs is different than a second height, also measured from the cold side of the combustor panel, of a second standoff of the plurality of standoffs.

In various embodiments, the first height of the first standoff is less than the second height of the second standoff. In various embodiments, the rail extends along a border of the combustor panel. In various embodiments, the first standoff is one of a first grouping of standoffs of the plurality of standoffs having the first height and the second standoff is one of a second grouping of standoffs of the plurality of standoffs having the second height. In various embodiments, a standoff effusion hole is defined in at least one first standoff of the first grouping of standoffs. In various embodiments, each first standoff of the first grouping of standoffs defines at least one standoff effusion hole.

The present disclosure also provides, according to various embodiments, a combustor panel that includes an attachment feature having a central longitudinal axis and configured to extend through a combustor shell, with the attachment feature having a tip portion configured to be disposed outward of a diffuser-facing side of the combustor shell and a base portion configured to be disposed between a cold side of the combustor panel and the diffuser-facing side of the combustor shell, wherein the base portion comprises a plurality of base legs extending from the cold side of the combustor panel.

In various embodiments, the plurality of base legs are circumferentially distributed around the central longitudinal axis of the attachment feature. In various embodiments, the plurality of base legs are base rails. In various embodiments, each base rail of the base rails comprises an outward surface configured to abut the combustor-facing side of the combustor shell. In various embodiments, the attachment feature and the plurality of base legs are integrally formed with the combustor panel. In various embodiments, the plurality of base legs extend from a tapered portion of the base portion of the attachment feature. The tapered portion may include a cross-sectional dimension that is less than a cross-sectional dimension of the tip portion. The tapered portion may converge towards the central longitudinal axis in a direction from the tip portion towards the base portion.

Also disclosed herein, according to various embodiments, is a combustor panel that includes an attachment feature having a central longitudinal axis and configured to extend through a combustor shell. The attachment feature may include a tip portion configured to be disposed outward of a diffuser-facing side of the combustor shell and a base portion configured to be disposed between a cold side of the combustor panel and the diffuser-facing side of the combustor shell, wherein the base portion comprises a tapered portion extending from the cold side of the combustor panel, wherein the tapered portion comprises a cross-sectional dimension that is less than a cross-sectional dimension of the tip portion.

In various embodiments, the tapered portion converges towards the central longitudinal axis in a direction from the tip portion towards the base portion. In various embodiments, the base portion comprises a plurality of base legs extending from the tapered portion. In various embodiments, the plurality of base legs are circumferentially distributed around the central longitudinal axis of the attachment feature. In, various embodiments, the plurality of base legs are base rails. Each base rail of the base rails may comprise an outward surface configured to abut the combustor-facing side of the combustor shell. In various embodiments, the attachment feature and the plurality of base legs are integrally formed with the combustor panel.

Also disclosed herein, according to various embodiments, is a combustor that includes a combustor panel having a plurality of mounting interfaces and an attachment feature having a tip portion and a base portion. The base portion may include a plurality of base legs, wherein each base leg of the plurality of base legs is coupled to a respective mounting interface of the plurality of mounting interfaces. In various embodiments, each base leg of the plurality of base legs comprises a tapered protrusion that is received within a corresponding receptacle of the respective mounting interface of the plurality of mounting interfaces. In various embodiments, the tapered protrusion is conical. In various embodiments, the attachment feature comprises a central longitudinal axis, wherein the central longitudinal axis extends through a gap defined between the base portion of the attachment feature and the cold side of the combustor panel. In various embodiments, the plurality of mounting interfaces and the plurality of base legs are circumferentially distributed around the central longitudinal axis of the attachment feature.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
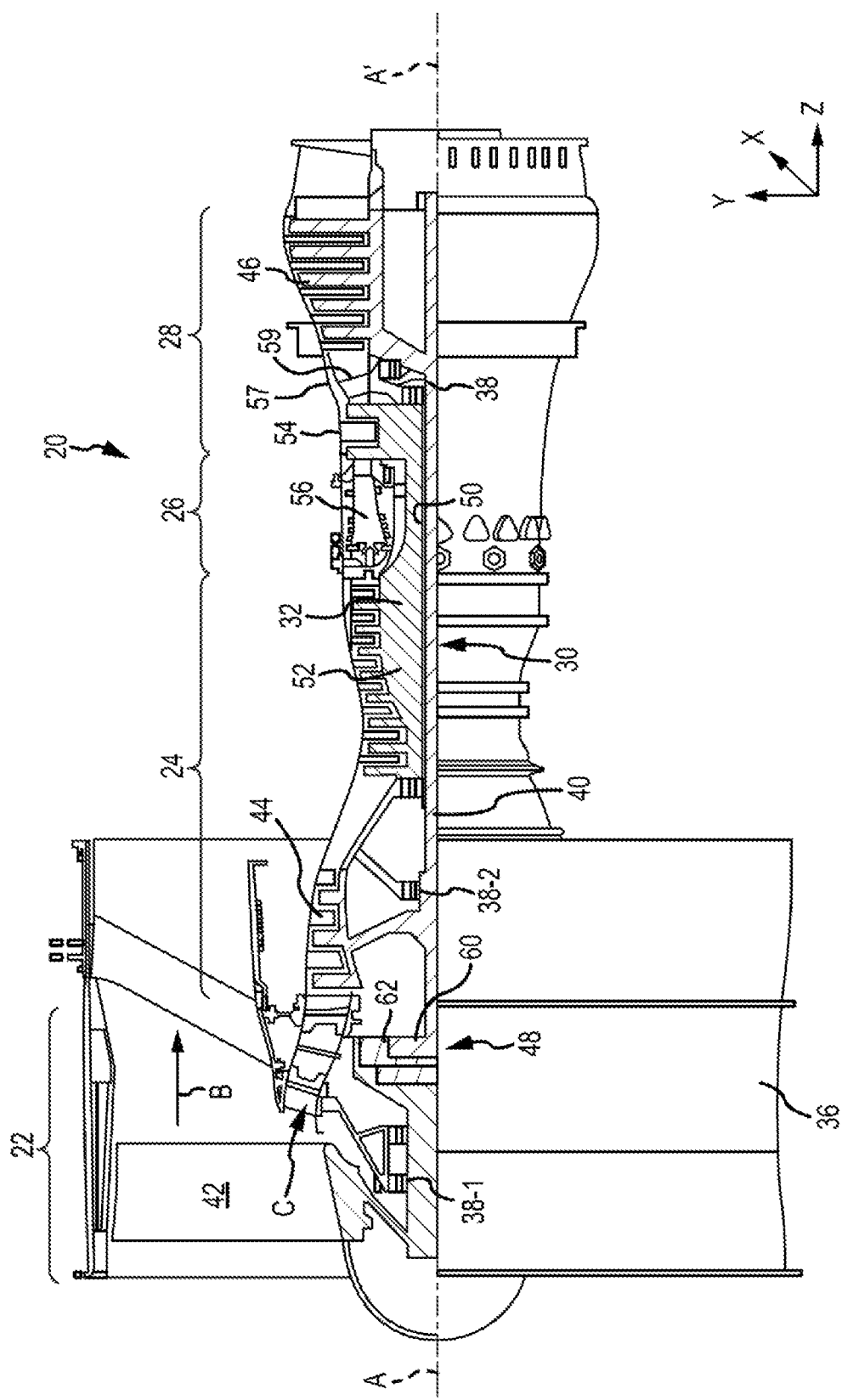
FIG. 1 is a cross-sectional view of an exemplary gas turbine engine, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the exhaust (e.g., the back end) of a gas turbine engine. As used herein, "forward" refers to the direction associated with the intake (e.g., the front end) of a gas turbine engine. A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor. The term "axial," as used herein, refers to a direction along or parallel to the engine central longitudinal axis.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow-path B while compressor section 24 can drive drive air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54.

A combustor 56 may be located between high pressure compressor 52 and high pressure turbine 54. The combustor section 26 may have an annular wall assembly having inner and outer shells that support respective inner and outer heat shielding liners. The heat shield liners may include a plurality of combustor panels that collectively define the annular combustion chamber of the combustor 56. An annular cooling cavity is defined between the respective shells and combustor panels for supplying cooling air. Impingement holes are located in the shell to supply the cooling air from an outer air plenum and into the annular cooling cavity.

A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2:
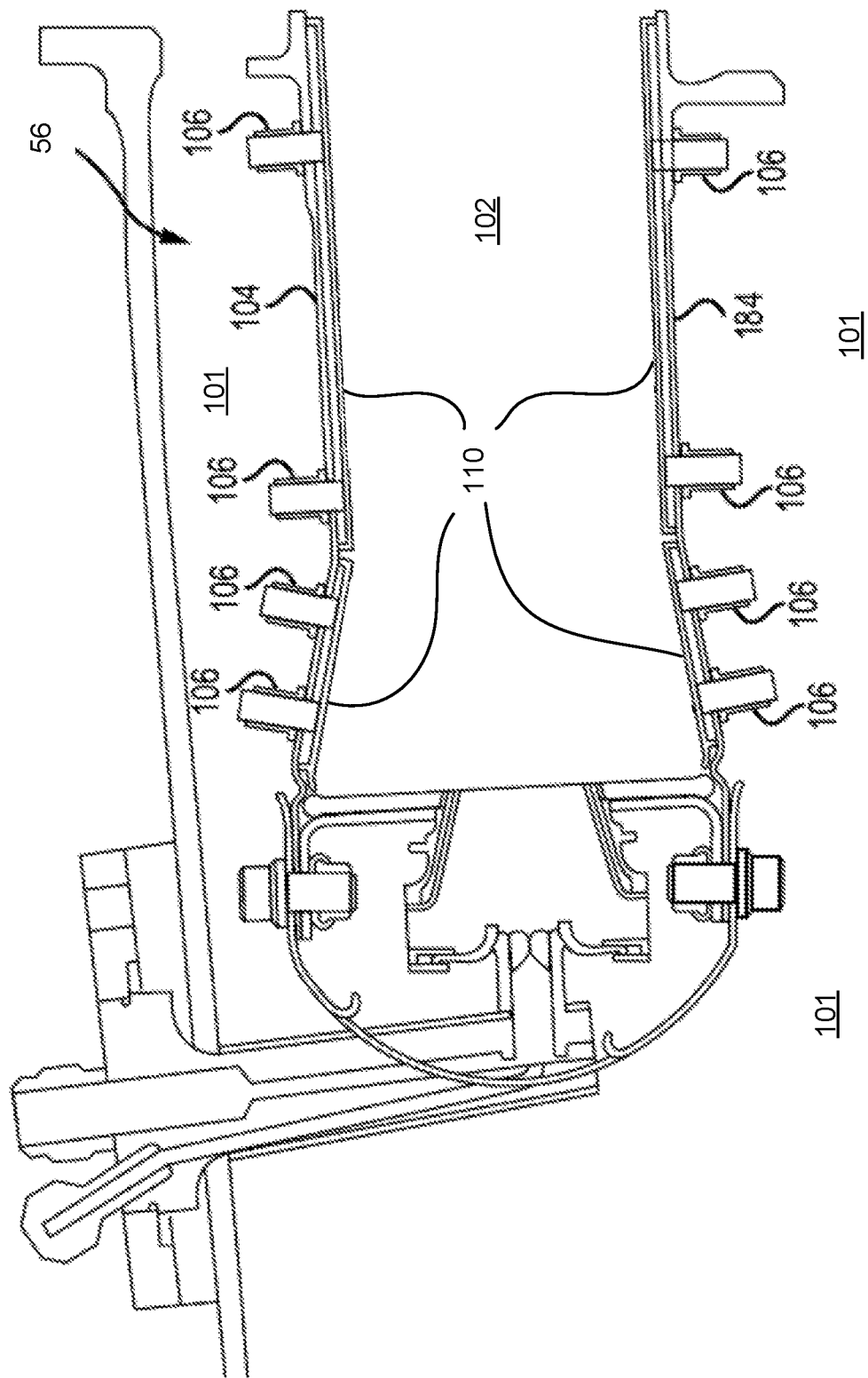
FIG. 2 is a cross-sectional view of a combustor of a gas turbine engine, in accordance with various embodiments.

With reference to FIG. 2, an in accordance with various embodiments, one or more combustor panels 110 (e.g., thermal shields, combustor liners) may be positioned in combustor 56 to protect various features of the combustor 56 from the high temperature flames and/or combustion gases. The combustor 56, in various embodiments, may have a combustor chamber 102 defined by a combustor outer shell 104 and a combustor inner shell 184. A diffuser chamber 101 is external the combustor 56 and cooling air may be configured to flow through the diffuser chamber 101 around the combustor 56. The combustor chamber 102 may form a region of mixing of core airflow C (with brief reference to FIG. 1) and fuel, and may direct the high-speed exhaust gases produced by the ignition of this mixture inside the combustor 56. The combustor outer shell 104 and the combustor inner shell 184 may provide structural support to the combustor 56 and its components. For example, a combustor outer shell 104 and a combustor inner shell 184 may comprise a substantially cylindrical or a substantially conical canister portion defining an inner area comprising the combustor chamber 102.

As mentioned above, it may be desirable to protect the combustor outer shell 104 and the combustor inner shell 184 from the harmful effects of high temperatures. Accordingly, one or more combustor panels 110 may be disposed inside the combustor chamber 102 and may provide such protection. The combustor panels 110 may comprise a partial cylindrical or conical surface section. An outer combustor thermal panel may be arranged radially inward of the combustor outer shell 104, for example, circumferentially about the inner surface of the combustor outer shell 104 and one or more inner combustor panels may also be arranged radially outward of the combustor inner shell 184. Thus, while the terms "radially outward" and "radially inward" are defined above as being relative to the engine central longitudinal axis A-A', the terms "outward" and "inward," without the modifier "radially," refer to positions relative to the combustor chamber 102. That is, the combustor shells 104, 184 are outward of the combustor panels 110, and vice versa. The combustor panels 110 may comprise a variety of materials, such as metal, metal alloys, and/or ceramic matrix composites, among others.

With continued reference to FIG. 2, the combustor panels 110 may be mounted and/or coupled to the combustor shell 104/184 via one or more attachment features 106. The combustor panels 110 may be made of any suitable heat tolerant material. In this manner, the combustor panels 110 may be substantially resistant to thermal mechanical fatigue in order to inhibit cracking of the combustor panels 110 and/or to inhibit liberation of portions of the combustor panels 110. In various embodiments, the combustor panels 110 may be made from a nickel based alloy and/or a cobalt based alloy, among others. For example, the combustor panels 110 may be made from a high performance nickel-based super alloy. In various embodiments, the combustor panels 110 may be made from a cobalt-nickel-chromium-tungsten alloy.

Figure 3A:
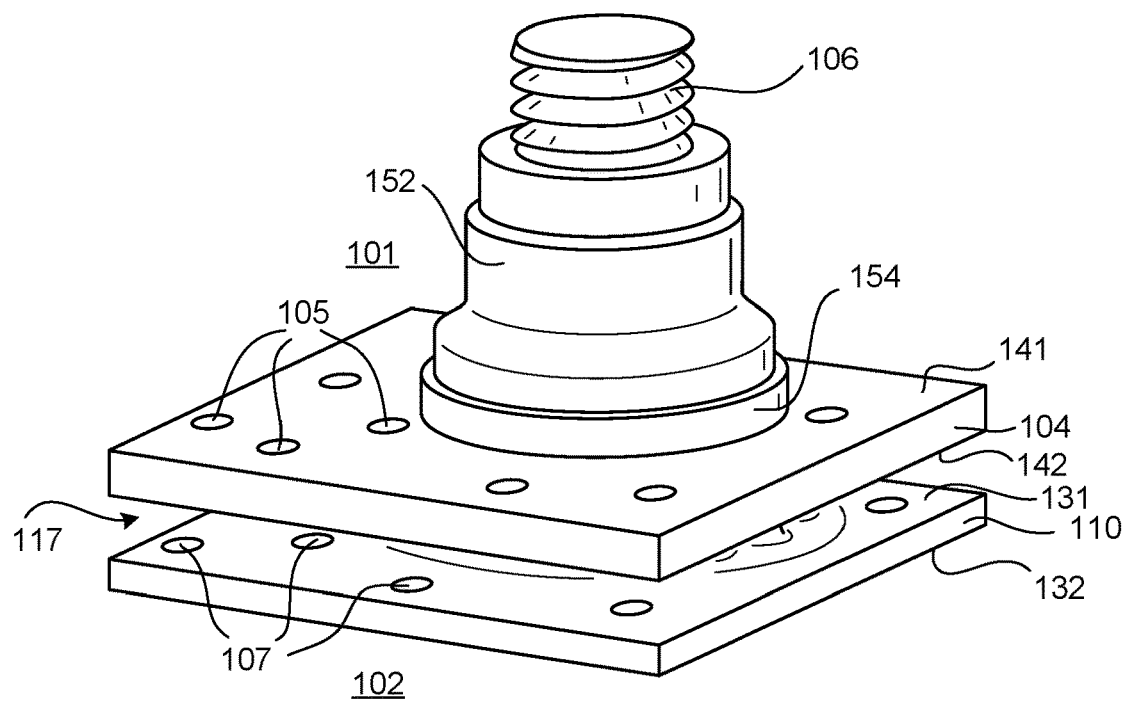
FIG. 3A is a perspective view of an attachment feature of a combustor panel extending through a combustor shell, in accordance with various embodiments.
Figure 3B:
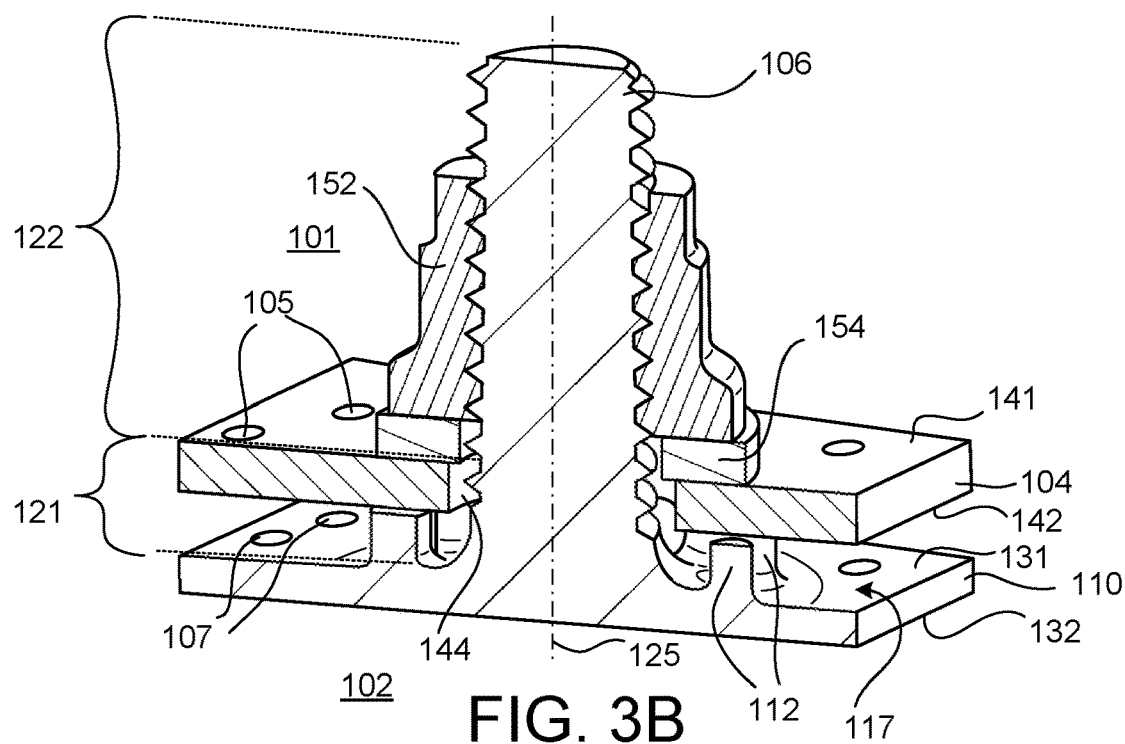
FIG. 3B is a perspective cross-sectional view of an attachment feature of a combustor panel extending through a combustor shell, in accordance with various embodiments.

In various embodiments, and with reference to FIGS. 3A and 3B, an annular cooling cavity 117 is formed and/or defined between the combustor shell 104 and the combustor panel 110. As mentioned above, cooling air in the diffuser chamber 101 may enter the annular cooling cavity 117 via impingement holes 105 formed in the combustor shell 104. That is, impingement holes 105 may extend from a diffuser-facing side 141 of the combustor shell 104 to a combustor-facing side 142 of the combustor shell 104 and may supply cooling air to the annular cooling cavity 117. The cooling air in the annular cooling cavity 117 may enter the combustor chamber 102 via effusion holes 107 formed in the combustor panel. That is, effusion holes 107 may extend from a cooling surface or "cold side" 131 of the combustor panel to a combustion facing surface or "hot side" 132 of the combustor panel that is opposite the cold side 131. In various embodiments, the effusion holes 107 are generally oriented to create a protective "blanket" of air film over the hot side 132 of the combustor panel thereby protecting the combustor panel from the hot combustion gases in the combustor chamber 102.

The one or more attachment features 106 facilitate coupling and/or mounting the combustor panels 110 to the respective shells 104, 184 of the combustor 56. In various embodiments, the attachment feature 106 may be a boss or a stud extending from the combustor panels 110. For example, the attachment feature 106 may be a cylindrical boss, such as a pin with a threaded circumference, or may be a rectangular boss, such as for receiving a clip, or may be any other apparatus whereby the combustor panel 110 is mounted to the combustor shell 104.

The attachment feature 106 may be integrally formed with the combustor panel 110. The attachment feature 106, according to various embodiments and with reference to FIG. 3B, has a central longitudinal axis 125 and extends from the cold side 131 of the combustor panel 110. The attachment feature 106 may include a base portion 121 and a tip portion 122. The base portion 121 of the attachment feature 106 is generally defined, according to various embodiments, as the section of the attachment feature 106 disposed between the cold side 131 of the combustor panel 110 and the diffuser-facing side 141 of the combustor shell 104. The tip portion 122 of the attachment feature 106 is generally defined, according to various embodiments, as the section of the attachment feature 106 disposed outward of the diffuser-facing side 141 of the combustor shell 104. Once again, as established above, the terms "outward" and "inward," without the modifier "radially", refer to positions relative to the combustor chamber 102. That is, the combustor shell 104 is outward of the combustor panel 110.

In various embodiments, the attachment feature 106 comprises a threaded stud that extends through a hole 144 in the combustor shell 104. The attachment feature 106 may be retained in position by a nut 152 disposed outward of the combustor shell 104 and engaged onto the attachment feature and torqued so that the attachment feature 106 is preloaded with a retaining force and securely affixes the combustor panel 110 in a substantially fixed position relative to the combustor shell 104. In various embodiments, and with continued reference to FIG. 3B, the combustor panel 110 includes a plurality of standoffs 112 extending from the cold side 131 of the combustor panel 110 that are circumferentially distributed around the base portion 121 of the attachment feature 106. In various embodiments, the standoffs 112 sustain a distance between the combustor panel 110 and the combustor shell 104 and prevent the combustor attachment feature 106 from being overloaded with a retaining force that would drive the combustor panel 110 and the combustor shell 104 too close together. In various embodiments, a washer 154 may be disposed between the nut 152 and the diffuser-facing side 141 of the combustor shell 104. In various embodiments, the hole 144 in the combustor shell 104 through which the attachment feature 106 extends may be oval, obround, or another elongated shape (e.g., a slot) to provide clearance/tolerance during assembly/installation of the combustor panel 110.

The high operating temperatures and pressure ratios of the combustion gases in the combustor section 26 may create operating environments that can damage various components of the combustor. A conventional combustor may cause hotspots to form in the vicinity of the attachment features and thus potentially shortening the operational life of the combustor because such areas of the assembly are prone to oxidation (e.g., "burnthrough") of the combustor panel. In various embodiments, a region of the combustor panel, the combustor shell, and the volume there-between, in a conventional combustor, may lack sufficient cooling airflow. This insufficient airflow in a conventional combustor is due in part because of the lack of effusion holes and/or impingement holes in the vicinity of the attachment feature 106. For example, it may be imprudent to have cooling holes in close proximity to the attachment feature 106 due to concerns regarding the structural integrity of the combustor panel if effusion holes are placed too close to the attachment feature 106. Additionally, impingement holes may not be operative if positioned too close to the attachment feature, as the washer 154 would cover such impingement holes. Therefore, disclosed herein, according to various embodiments, are various combustor configurations for reducing hotspots in the vicinity of attachment features 106 and/or for providing cooling airflow to and in the vicinity of attachment features 106.

In various embodiments, and with reference to FIGS. 4A, 4B, 5A, 5B, 6A, 6B, and 6C, one or more cooling passages are formed in the attachment feature 106 to provide cooling airflow to and in the vicinity of the attachment feature 106. In various embodiments, and with reference to FIGS. 7A, 7B, 8, 9A, 9B, 10A, 10B, 11A, 11B, and 11C, one or more cooling passages are formed in the nut and/or washer to provide cooling airflow to and in the vicinity of the attachment feature 106. In various embodiments, and with reference to FIGS. 12A, 12B, 13A, and 13B, the configuration of the standoffs 112 and the location of the attachment feature 106 relative to combustor panel rails are optimized to provide cooling airflow to and in the vicinity of the attachment feature 106. In various embodiments, and with reference to FIGS. 14A, 14B, 15A, 15B, 15C, and 15D, the interface/joint between the attachment feature 106 and the combustor panel 110 is optimized to provide cooling airflow to and in the vicinity of the attachment feature 106.

Figure 4A:
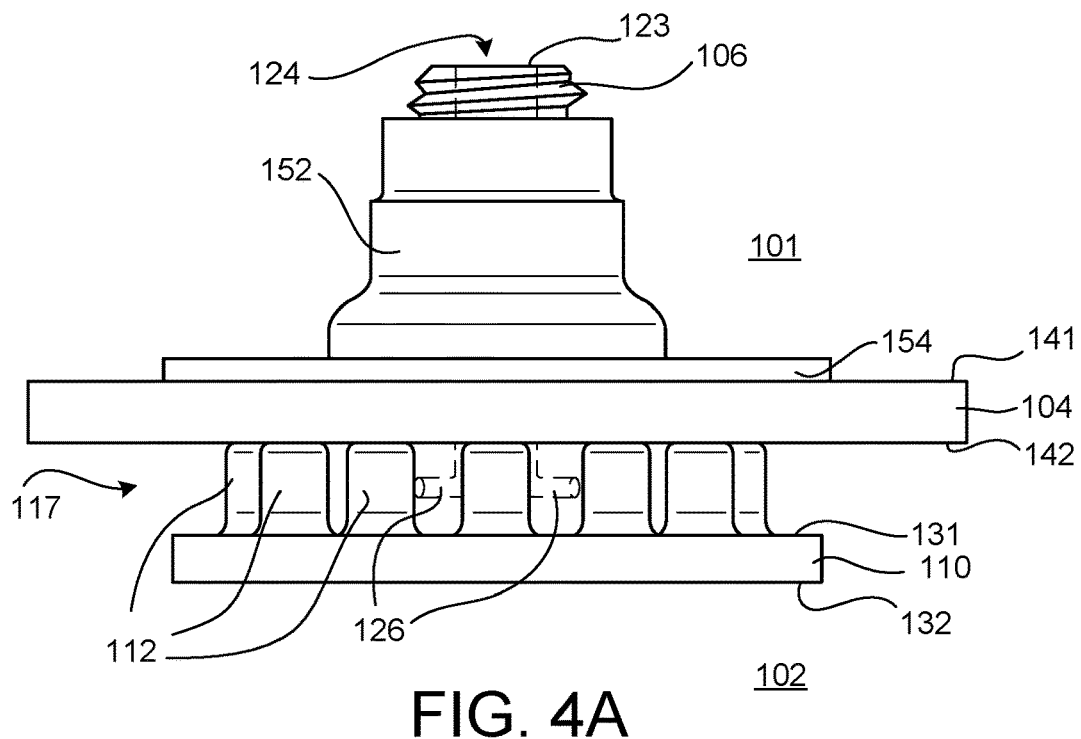
FIG. 4A is a side view of an attachment feature of a combustor panel extending through a combustor shell, with the attachment feature defining a core passage and a plurality of offshoot passages, in accordance with various embodiments.
Figure 4B:
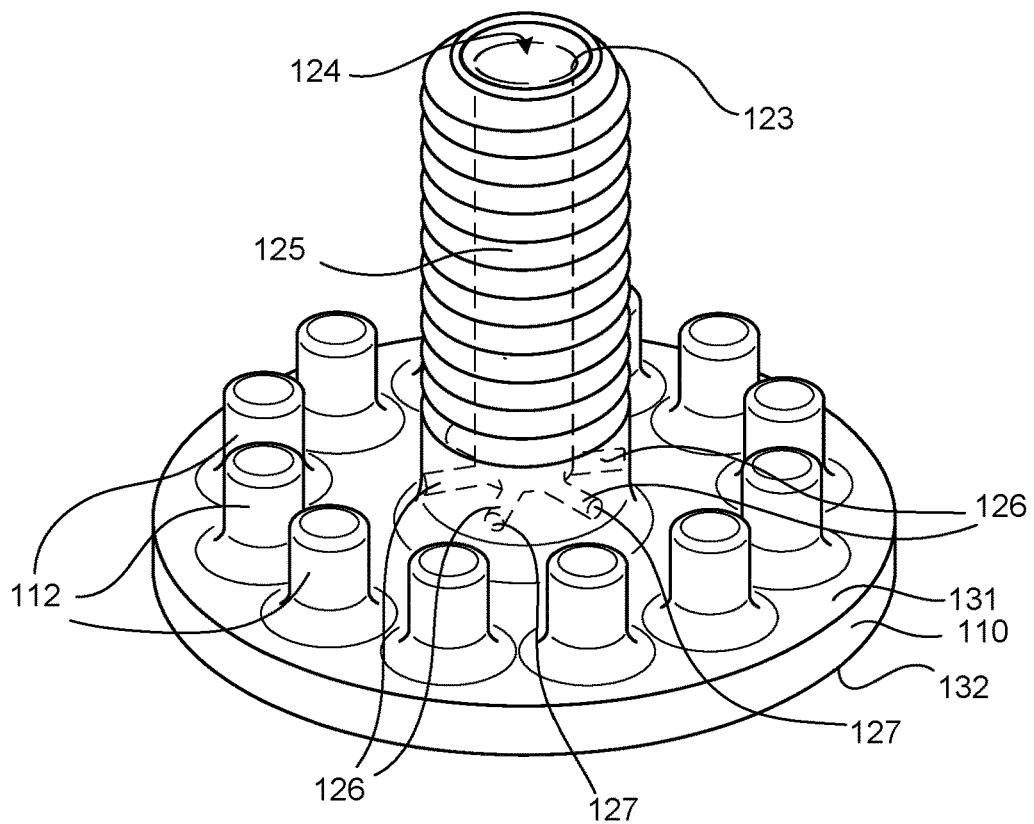
FIG. 4B is a perspective view of an attachment feature defining a core passage and a plurality of offshoot passages, in accordance with various embodiments.

In various embodiments, and with reference to FIGS. 4A and 4B, the attachment feature 106 defines a core passage 124 and one or more offshoot passages 126. The core passage 124 extends from an inlet opening 123 defined on the tip portion 122 of the attachment feature 106 and extends partially through a length of the attachment feature 106. That is, the core passage 124 terminates (i.e., has a closed, terminating end) within the attachment feature 106 and thus does not extend entirely through the attachment feature 106 and does not extend through the combustor panel 110 to the combustor chamber 102, according to various embodiments. The closed end of the core passage 124 may be in the tip portion 122 or the base portion 121. The offshoot passage 126 extends from the core passage 124 to an outlet opening 127 defined on the base portion 121 of the attachment feature 106. Said differently, the outlet opening 127 of the offshoot passage 126 is defined on a circumference (i.e., a peripheral surface) of the base portion 121 of the attachment feature and extends to intersect the core passage 124. Thus, the core passage 124 and the offshoot passage 126 collectively form a cooling airflow conduit from the diffuser chamber 101, through the tip portion 122 of the attachment feature 106, and into the annular cooling cavity 117. Accordingly, the core passage 124 and the offshoot passage 126 provide cooling airflow to the attachment feature 106 and provide impingement cooling to the cold side 131 of the combustor panel 110 in the vicinity of the base portion 121 of the attachment feature 106.

In various embodiments, and with continued reference to FIGS. 4A and 4B, the core passage 124 extends parallel to the central longitudinal axis 125. In various embodiments, the core passage 124 is coaxial with the central longitudinal axis 125. In various embodiments, the offshoot passage(s) 124 may be circumferentially distributed around and may extend radially, relative to the central longitudinal axis 125 of the attachment feature 106, from the core passage 124. In various embodiments, the attachment feature 106 may define a plurality of offshoot passages 126. For example, the attachment feature 106 may define between 2 and 5 offshoot passages 126. In various embodiments, the attachment feature 106 defines 3 offshoot passages. In various embodiments, the attachment feature 106 defines 4 offshoot passages.

In various embodiments, the outlet opening 127 of the offshoot passage(s) 126 is configured to deliver impingement cooling air to an interconnected volume defined between the standoffs 112 and the attachment feature 106. That is, the offshoot passage(s) 126 are configured for delivering cooling airflow to the portion of the annular cooling cavity 117 adjacent the attachment feature 106. In various embodiments, the outlet opening 127 of the offshoot passage(s) 126 is disposed inward of the washer 154.

Figure 5A:
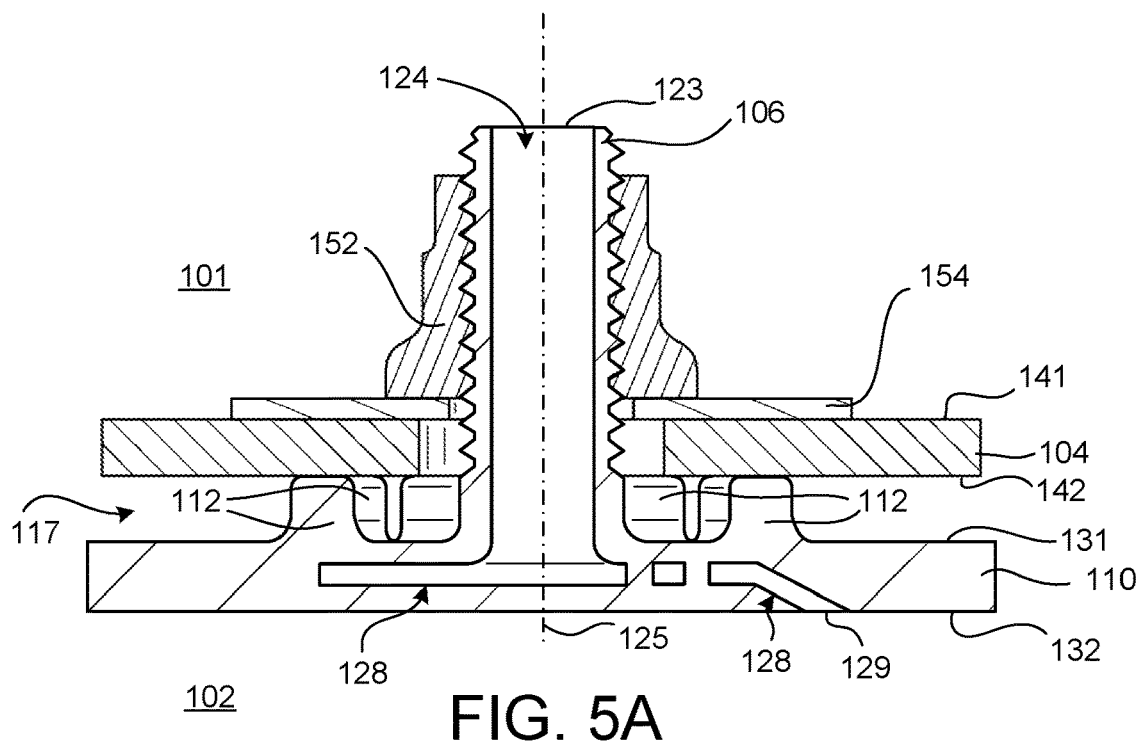
FIG. 5A is a cross-sectional view of an attachment feature of a combustor panel extending through a combustor shell, with the attachment feature defining a core passage and the combustor panel defining a network of cooling passages fluidly coupled to the core passage, in accordance with various embodiments.
Figure 5B:
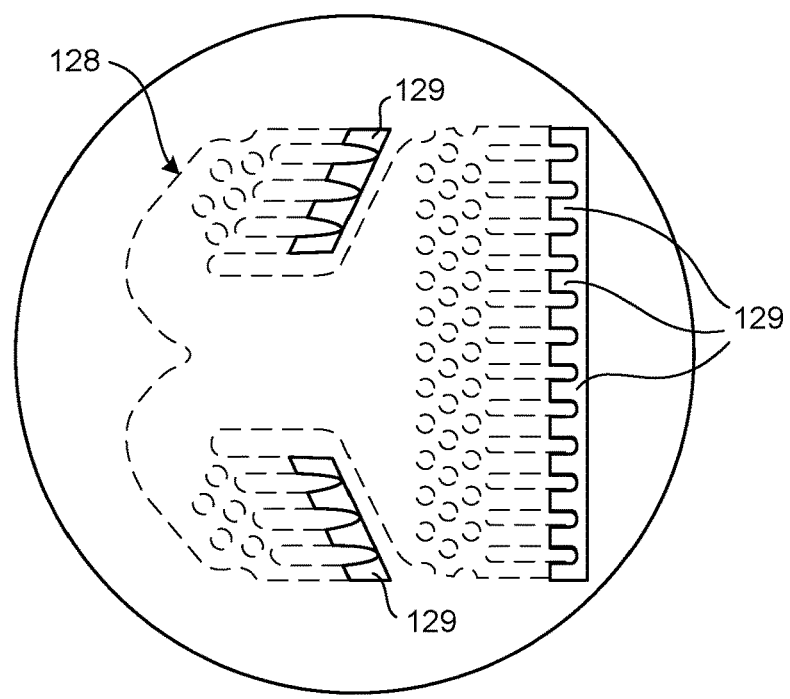
FIG. 5B is a view of the hot side of a combustor panel showing a network of cooling passages, in accordance with various embodiments.

In various embodiments, and with reference to FIGS. 5A and 5B, the core passage 124 may be fluidly connected to a network of cooling passages 128 defined in the combustor panel 110. Accordingly, in various embodiments, cooling airflow from the core passage 124 is delivered to the network of cooling passages 128 instead of or in addition to the offshoot passages 126 described above. The network of cooling passages 128 defined in the combustor panel 110 may extend from the core passage 124 to the hot side 132 of the combustor panel 110 to deliver effusion cooling to the hot side 132 of the combustor panel 110.

In various embodiments, the network of cooling passages 128 is substantially confined within a footprint or boundary of the plurality of standoffs 112. That is, the network of cooling passages 128 provides localized effusion cooling to the section/portion of the hot side 132 of the combustor panel 110 that is inward from the nut 152, washer 154, and standoffs 112. In various embodiments, the core passage 124 is the exclusive source of cooling airflow to the network of cooling passages 128 defined within the localized section of the combustor panel 110. Said differently, the network of cooling passages 128 may not be supplied with cooling air from the annular cooling cavity 117 between the combustor shell 104 and the combustor panel 110, but instead the cooling air is directly from the diffuser chamber 101 via the core passage 124.

In various embodiments, the network of cooling passages 128 includes a plurality of effusion outlets 129 defined on the hot side 132 of the combustor panel 110. The effusion outlets 129 of the network of cooling passages 128 may have a uniform effusion orientation. Said differently, each effusion outlet of the plurality of effusion outlets 129 may be oriented in the same, uniform direction as the other effusion outlets.

Figure 6A:
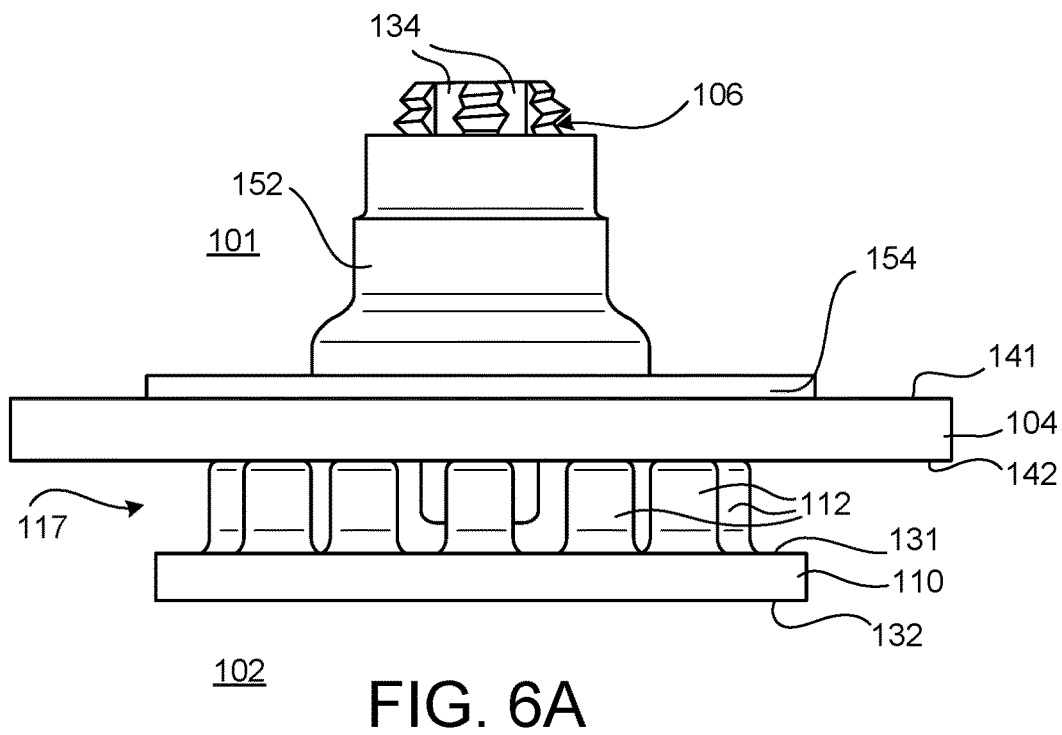
FIG. 6A is a side view of an attachment feature of a combustor panel extending through a combustor shell, with the attachment feature defining a plurality of peripheral channels defined in a peripheral surface of the attachment feature, in accordance with various embodiments.
Figure 6B:
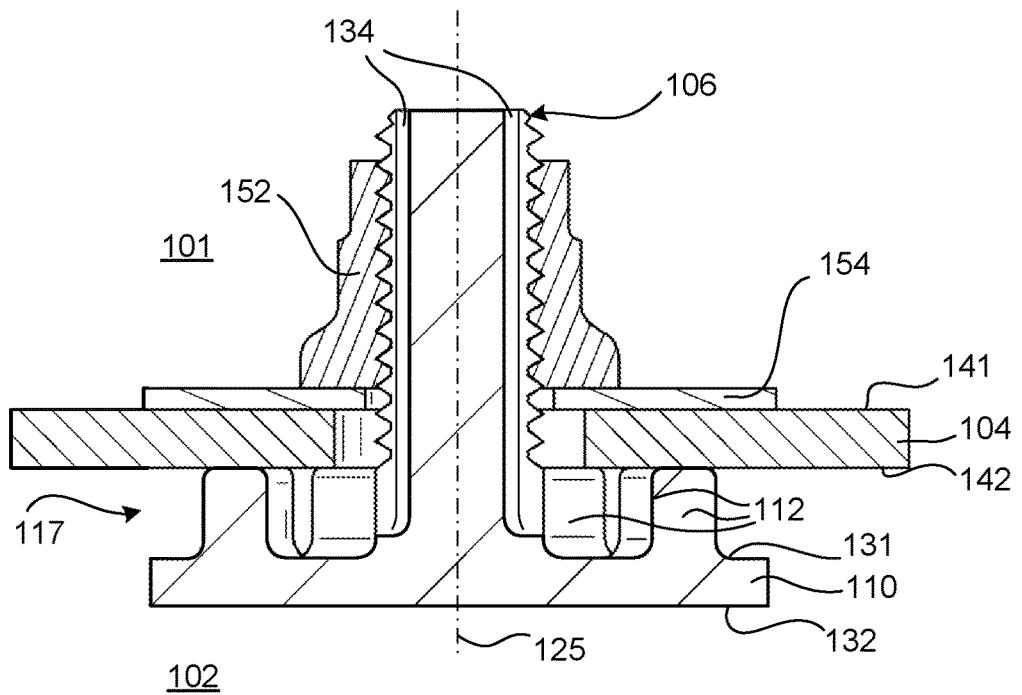
FIG. 6B is a cross-sectional view of an attachment feature of a combustor panel extending through a combustor shell, with the attachment feature defining a plurality of peripheral channels defined in a peripheral surface of the attachment feature, in accordance with various embodiments.
Figure 6C:
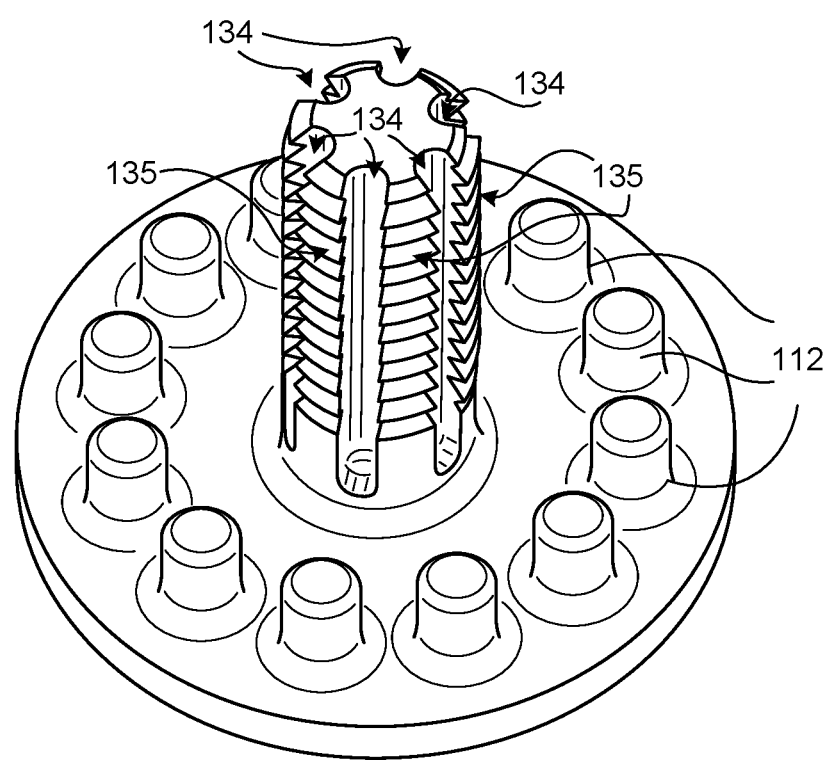
FIG. 6C is a perspective view of an attachment feature of a combustor panel, with the attachment feature having a plurality of peripheral channels defined in a peripheral surface of the attachment feature, in accordance with various embodiments.

In various embodiments, and with reference to FIGS. 6A, 6B, and 6C, the attachment feature 106 has one or more peripheral channels 134 defined on a peripheral surface of the attachment feature 106. Said differently, the external, peripheral surface of the attachment feature 106 may be slotted so as to have open channels or grooves (e.g., open troughs) that extend at least partially along a length of the attachment feature 106. The peripheral channels 134 may extend substantially parallel to the central longitudinal axis 125 of the attachment feature 106.

The peripheral channels 134 are configured to convey cooling airflow from the diffuser chamber 101 through the combustor shell 104 and deliver cooling airflow to the annular cooling cavity 117 and/or impingement cooling to the cold side 131 of the combustor panel 110 in the vicinity of the base portion 121 of the attachment feature 106. In various embodiments, the peripheral channels 134 deliver cooling flow to the volume or space defined between the plurality of standoffs 112 and the attachment feature 106. The peripheral channels 134, according to various embodiments, extend far enough outwards along the attachment feature 106 so as to be open to the diffuser chamber 101 outward of the nut 152. That is, in response to the nut 152 being rotated to an installed, retention providing position, the peripheral channels 134 are disposed outward of the outward surface of the nut.

In various embodiments, the peripheral channels 134 are circumferentially distributed around the peripheral surface of the attachment feature 106. In various embodiments, the attachment features 106 may have, for example, six (6) peripheral channels 134 defined in its peripheral surface. In various embodiments, the peripheral surface of the attachment feature 106 has threads. Because of the distributed configuration of the peripheral channels 134, the attachment feature 106 may have threaded sections 135 of the peripheral surface that are circumferentially interposed between circumferentially adjacent peripheral channels 134.

Figure 7A:
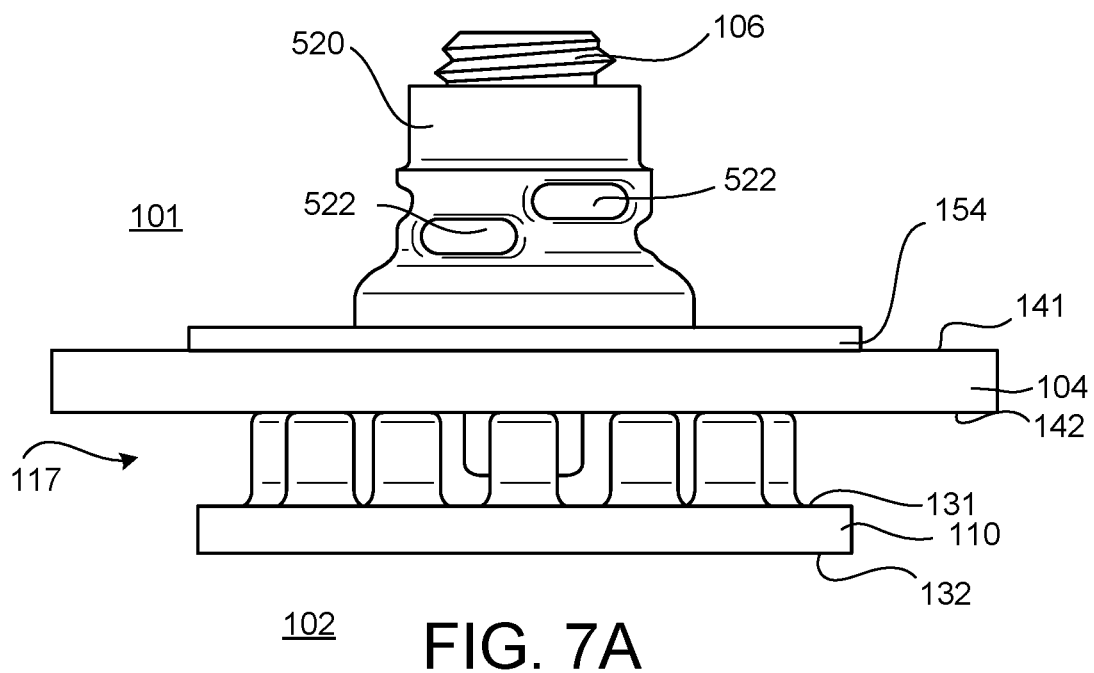
FIG. 7A is a side view of an attachment feature of a combustor panel extending through a combustor shell and engaging a nut having a plurality of apertures, in accordance with various embodiments.
Figure 7B:
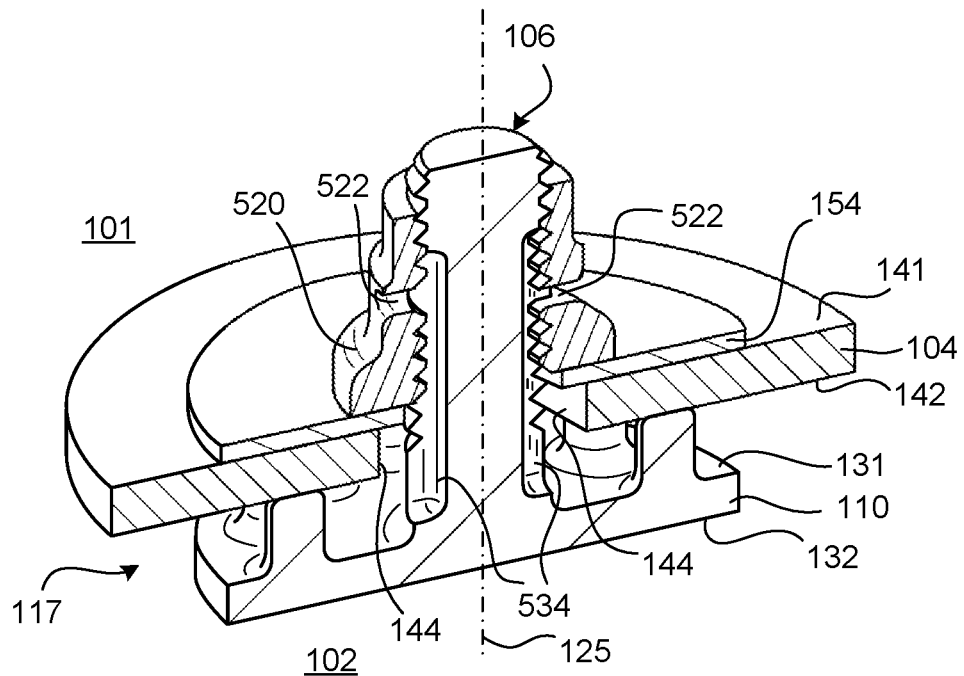
FIG. 7B is a perspective cross-sectional view of an attachment feature of a combustor panel extending through a combustor shell and engaging a nut having a plurality of apertures, the attachment feature having a plurality of peripheral channels corresponding to the plurality of apertures, in accordance with various embodiments.

In various embodiments, and with reference to FIGS. 7A and 7B, combustor 56 (FIG. 1) may include a retention feature 520, such as nut 152, that defines one or more passages 522. The one or more passages 522 defined in the retention feature 520 provide fluid communication between the diffuser chamber 101 and the annular cooling cavity 117. In various embodiments, and with continued reference to FIGS. 7A and 7B, the passage 522 extends substantially perpendicular to the central longitudinal axis 125 through the retention feature 520. Generally, cooling airflow from the diffuser chamber 101 flows through the passage 522 and inward through the hole 144 in the combustor shell 104 where it is delivered to the annular cooling cavity adjacent the base portion of the attachment feature 106. Thus, the passage 522 defined in the retention feature 520 facilitates the flow of cooling air to the attachment feature 106 and to the area adjacent the attachment feature 106.

Figure 8:
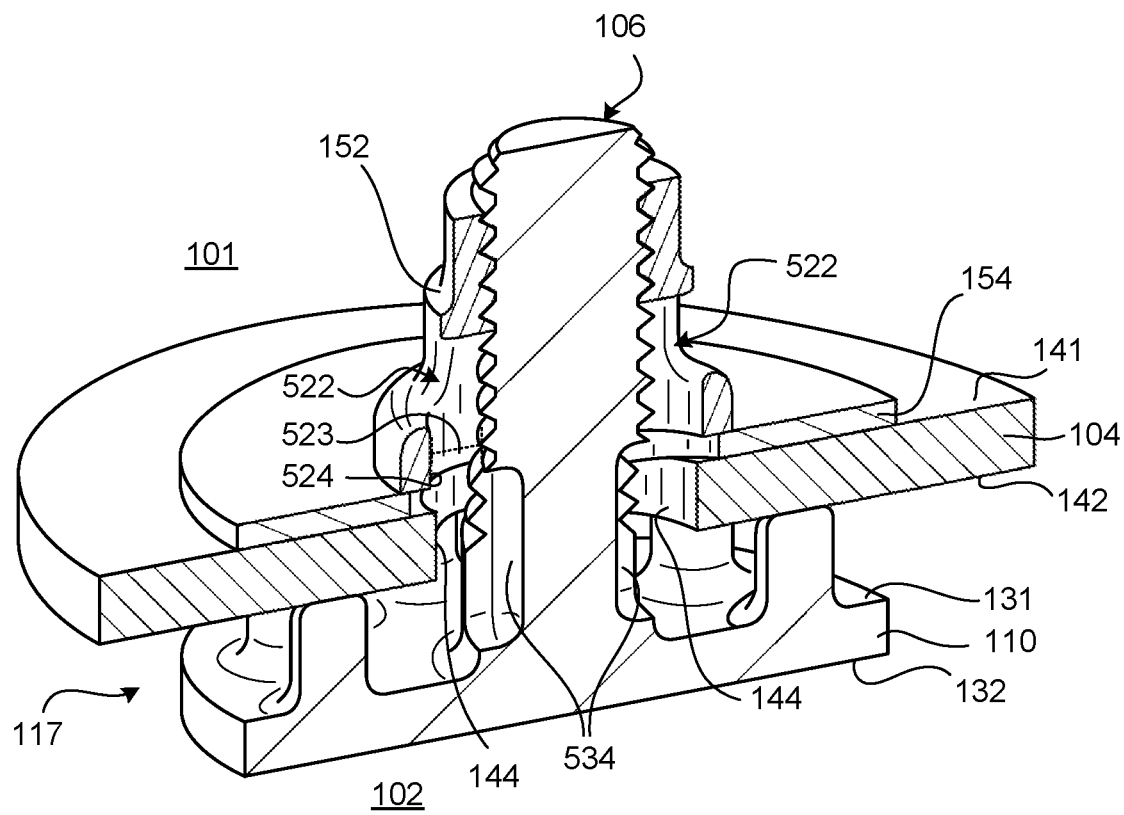
FIG. 8 is a perspective cross-sectional view of an attachment feature of a combustor panel extending through a combustor shell and engaging a nut having a plurality of apertures, the attachment feature having a plurality of peripheral channels corresponding to the plurality of apertures, in accordance with various embodiments.

In various embodiments, and with momentary reference to FIG. 8, a gap 523 is defined between an inner surface 524 of the retention feature 520 (at least the portion of the inner surface 524 that is inward of the passage 522) and the peripheral surface of the attachment feature 106. Cooling airflow entering through the passage 522 is directed to flow through the gap 524 and then arrives at the annular cooling cavity 117. In various embodiments, the hole 144 defined in the combustor shell 104 (and/or the aperture defined in the washer 154) is large enough to allow for cooling air to flow through the passage 522 and inward through the gap 524 and through the combustor shell 104 to the annular cooling cavity 117. In various embodiments, and with reference to FIGS. 11A, 11B, and 11C, the hole 144 in the combustor shell 104 is defined by a non-circular inner edge 544. Accordingly, the inner edge 544 of the combustor shell defining the hole 144 may have an undulating shape and/or may include one or more lobes. Said differently, the hole 144 of the combustor shell 104 may have a lobed geometry that includes a plurality of lobes circumferentially distributed around the inner edge 544 defining the hole 144. In various embodiments, the one or more lobes align with the one or more passages 522, thus allowing cooling airflow to enter the passages 522, flow inwards through the lobes of inner edge 544 of the hole 144, and into the annular cooling cavity 117.

In various embodiments, and with renewed reference to FIGS. 7A and 7B, the attachment feature 106 includes one or more peripheral channels 534 defined on the peripheral surface of the attachment feature 106. In various embodiments, the one or more peripheral channels 534 and the one or more passages 522 jointly form a fluid flow path that enables fluid communication between the diffuser chamber 101 and the annular cooling cavity 117. In various embodiments, a plurality of peripheral channels 534 may be circumferentially distributed around the attachment feature 106 and a plurality of passage 522 may be circumferentially distributed around the retention feature. In various embodiments, the plurality of peripheral channels 534 may be configured to be aligned with the plurality of passages 522.

In various embodiments, the peripheral channel(s) 534 extends from the base portion to the tip portion of the attachment feature 106. In various embodiments, the peripheral channel(s) 534 extends along a partial length of the attachment feature 106. Said differently, the peripheral channel(s) 534 may not extend along an entire length of the attachment feature 106. For example, the peripheral channel 534 may terminate in the tip portion inward of an outward edge of the retention feature 520. Once again, as used herein, the terms "outward" and "inward," without the modifier "radially," refer to positions relative to the combustor chamber 102. That is, the combustor shells 104, 184 are outward of the combustor panels 110, and vice versa. Accordingly, the peripheral channel 534 does not extend outward beyond the retention feature 520, according to various embodiments. In various embodiments, the peripheral channel(s) 534 terminates in the base portion inward of the combustor-facing side 142 of the combustor shell 104. In various embodiments, and with reference to FIG. 8, the peripheral channel(s) 534 may extend along the peripheral surface less than 50% of the total length of the attachment feature. In various embodiments, and with continued reference to FIG. 8, the peripheral channel(s) 534 may terminate inward of the passage(s) 522 defined in the retention feature 520, and the gap 523 may be disposed substantially between the passage 522 and the peripheral channel 534.

Figure 9A:
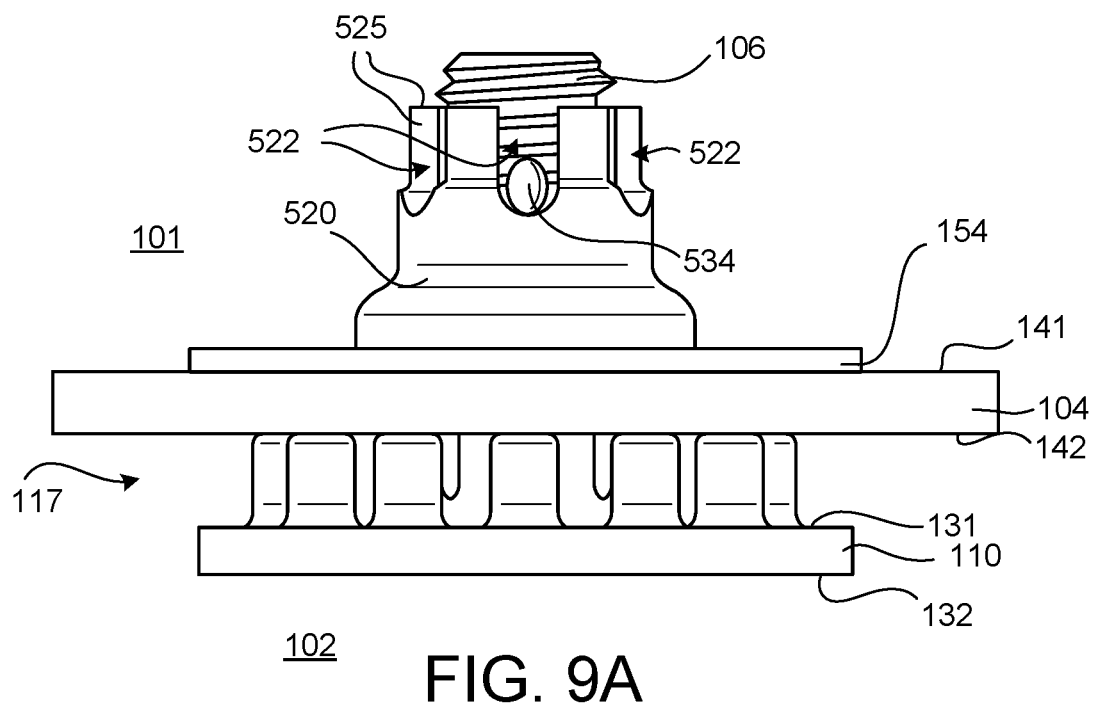
FIG. 9A is a side view of an attachment feature of a combustor panel extending through a combustor shell and engaging a nut having a plurality of notches, in accordance with various embodiments.
Figure 9B:
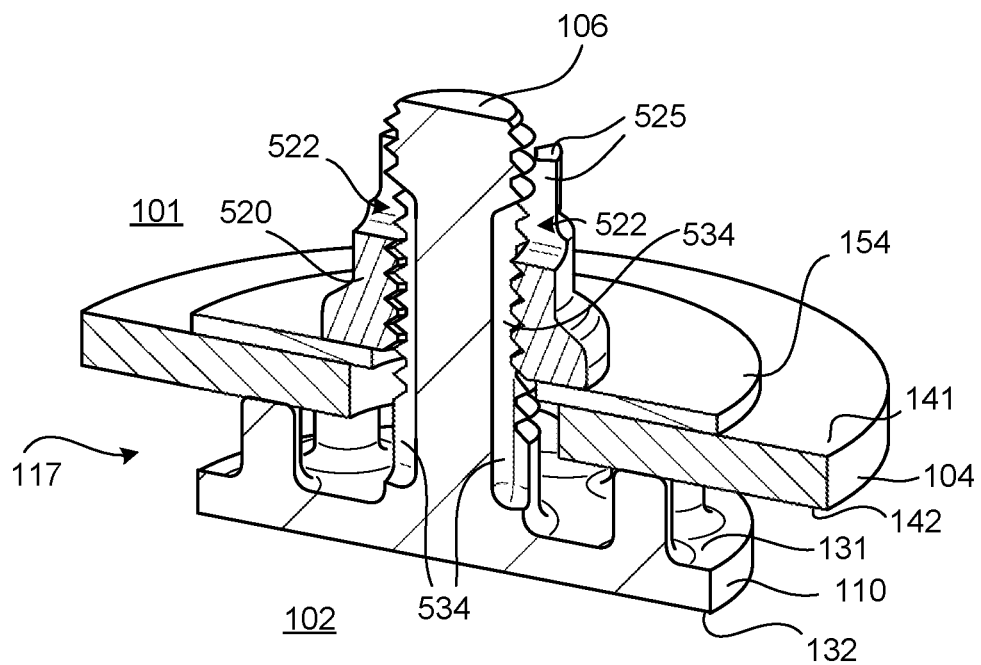
FIG. 9B is a perspective cross-sectional view of an attachment feature of a combustor panel extending through a combustor shell and engaging a nut having a plurality of notches, the attachment feature having a plurality of peripheral channels corresponding to the plurality of notches, in accordance with various embodiments.
Figure 10A:
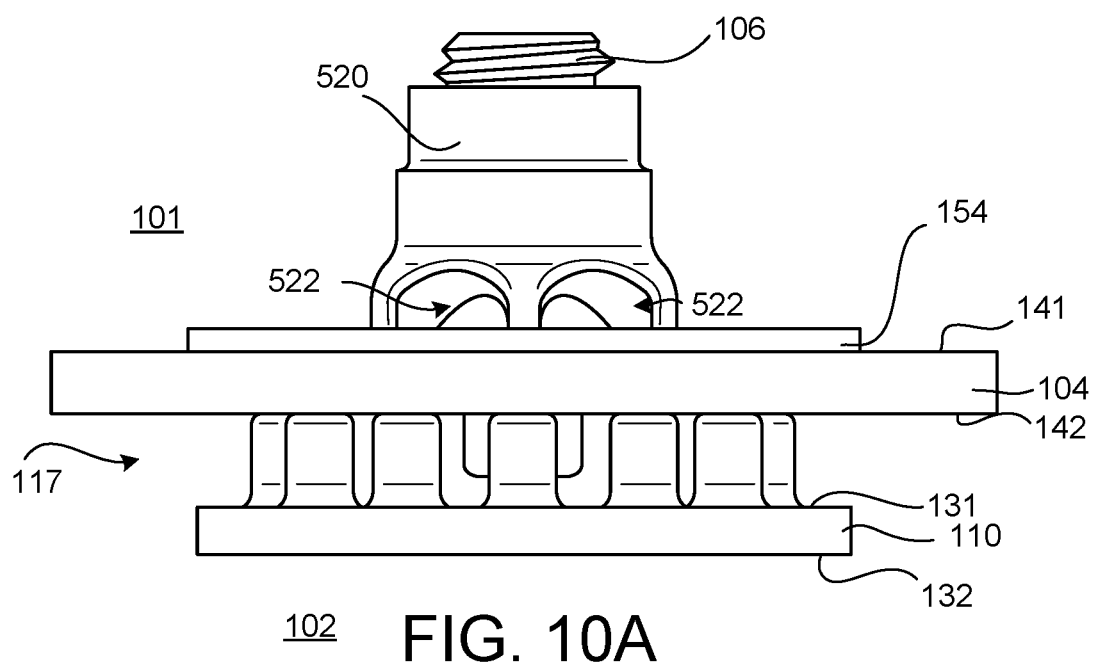
FIG. 10A is a side view of an attachment feature of a combustor panel extending through a combustor shell and engaging a nut having a plurality of apertures, in accordance with various embodiments.
Figure 10B:
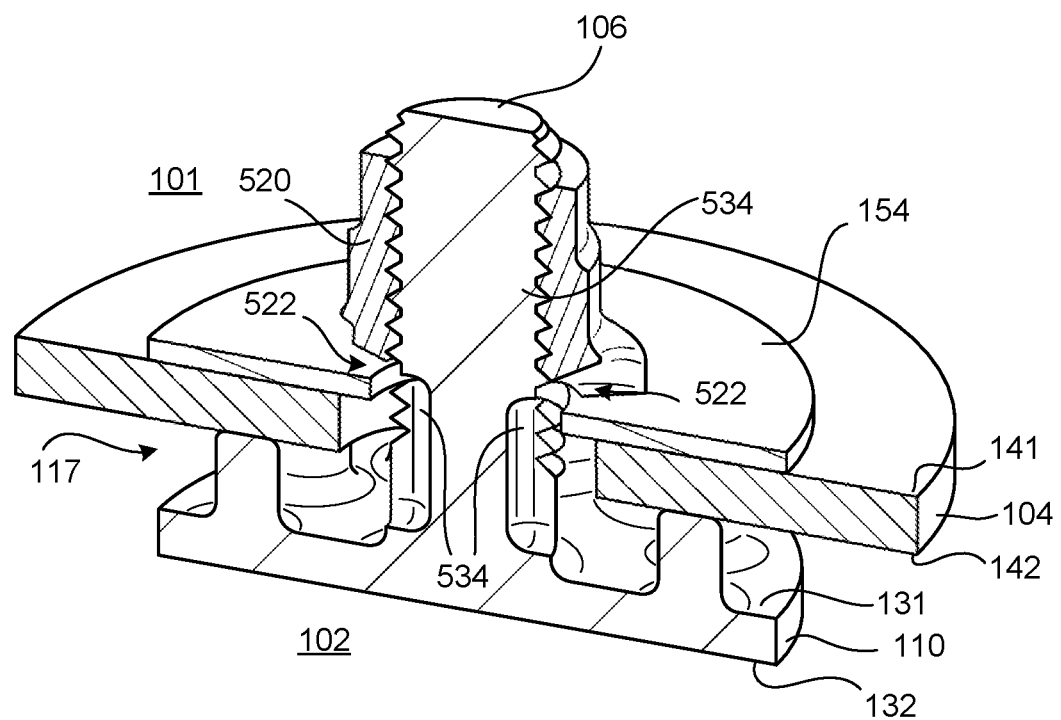
FIG. 10B is a perspective cross-sectional view of an attachment feature of a combustor panel extending through a combustor shell and engaging a nut having a plurality of apertures, the attachment feature having a plurality of peripheral channels corresponding to the plurality of apertures, in accordance with various embodiments.
Figure 11A:
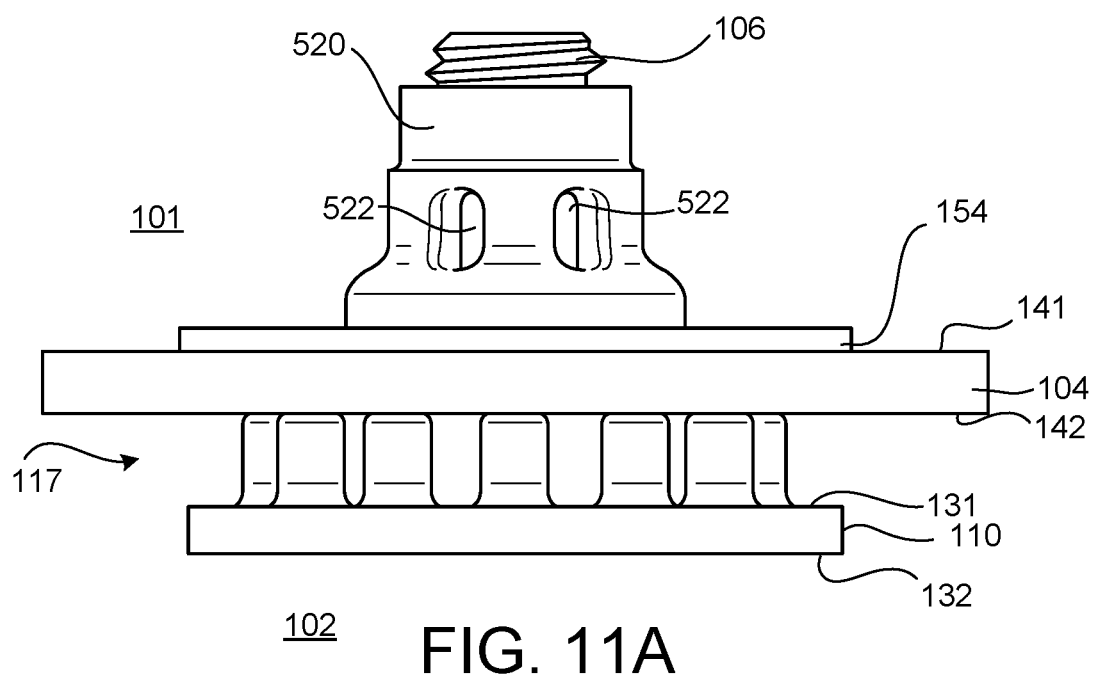
FIG. 11A is a side view of an attachment feature of a combustor panel extending through a combustor shell and engaging a nut having a plurality of apertures, in accordance with various embodiments.
Figure 11B:
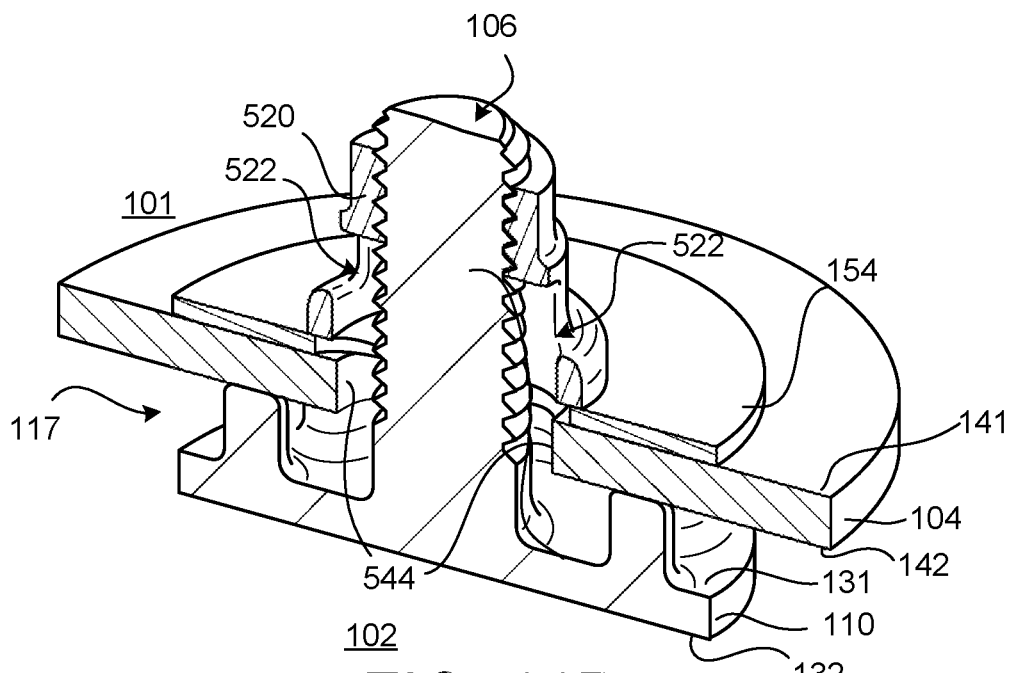
FIG. 11B is a perspective cross-sectional view of an attachment feature of a combustor panel extending through a combustor shell and engaging a nut having a plurality of apertures, with a washer having a plurality of grooves corresponding to the plurality of apertures, in accordance with various embodiments.
Figure 11C:
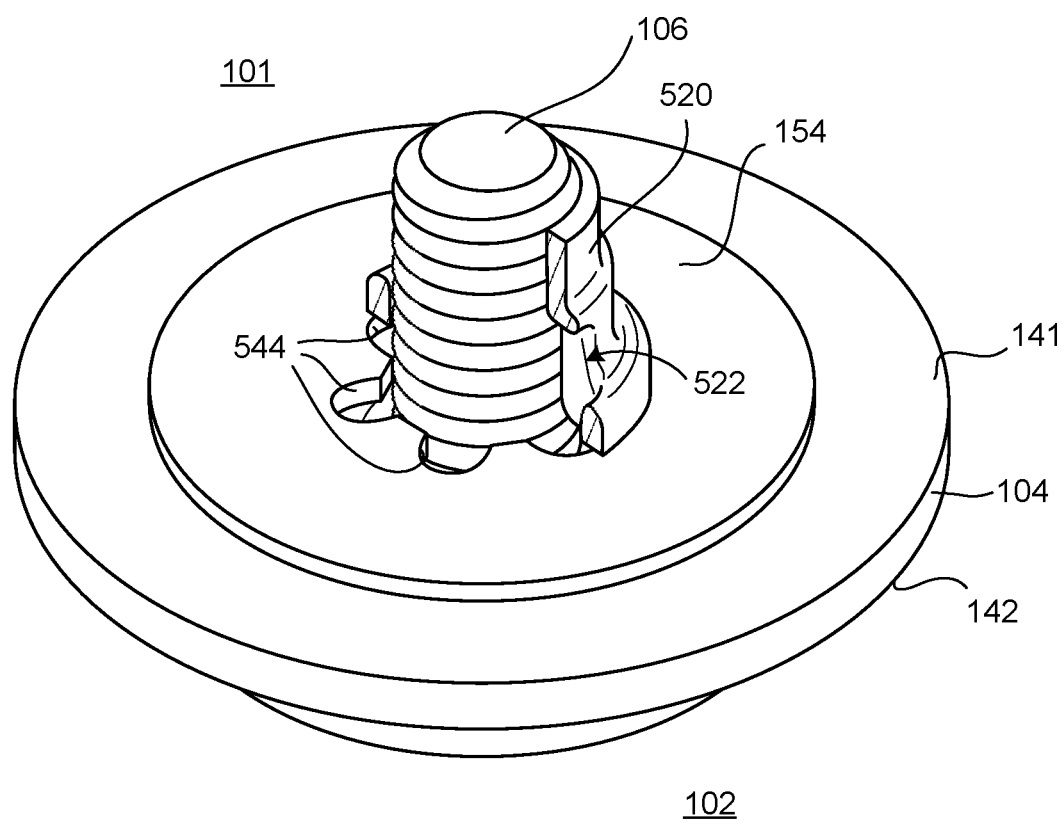
FIG. 11C is a perspective view of an attachment feature of a combustor panel extending through a combustor shell and engaging a nut, shown in cross-section, having a plurality of apertures, with a washer having a plurality of grooves corresponding to the plurality of apertures, in accordance with various embodiments.

In various embodiments, and with reference to FIGS. 9A and 9B, the retention feature 520 includes a crenellated outward rim 525, such that the passages 522 correspond to respective notches in the crenellated outward rim 525. The notches (i.e., passages 522) of the crenellated outward rim 525 may correspond to, and may be aligned with, respective peripheral channels 534. In various embodiments, and with reference to FIGS. 10A and 10B, the one or more passages 522 may be archways formed in an inward rim of the retention feature 520.

Figure 12A:
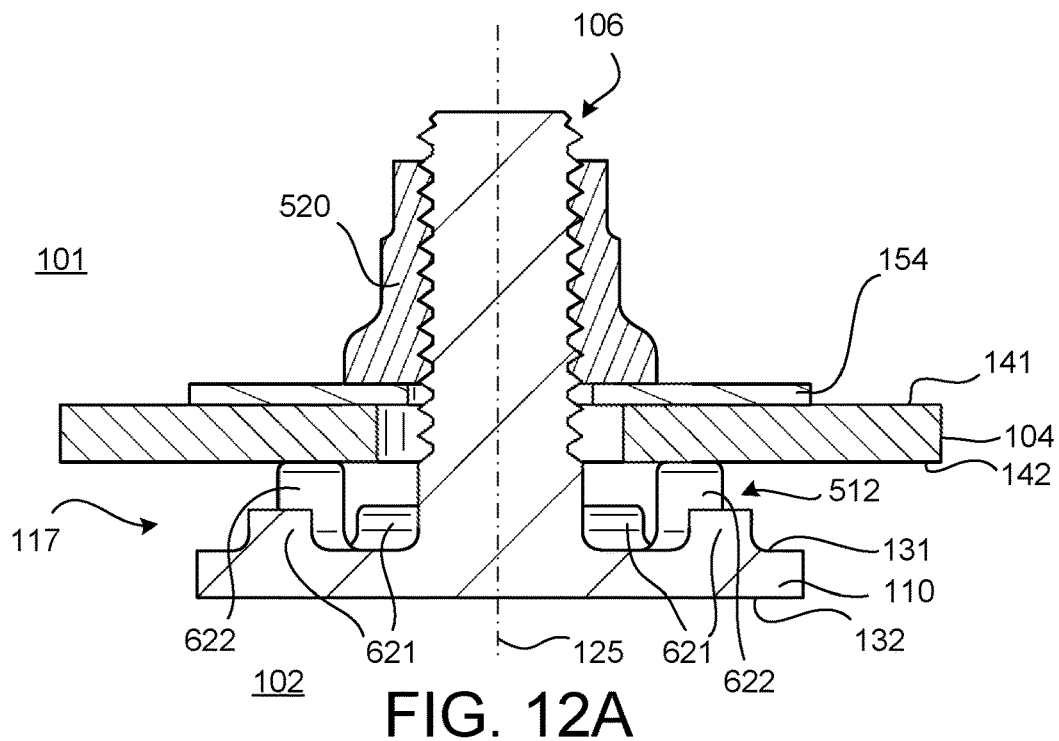
FIG. 12A is a cross-sectional view of an attachment feature of a combustor panel extending through a combustor shell, the combustor panel comprising a plurality of standoffs disposed around the attachment feature, the standoffs having a non-uniform height, in accordance with various embodiments.
Figure 12B:
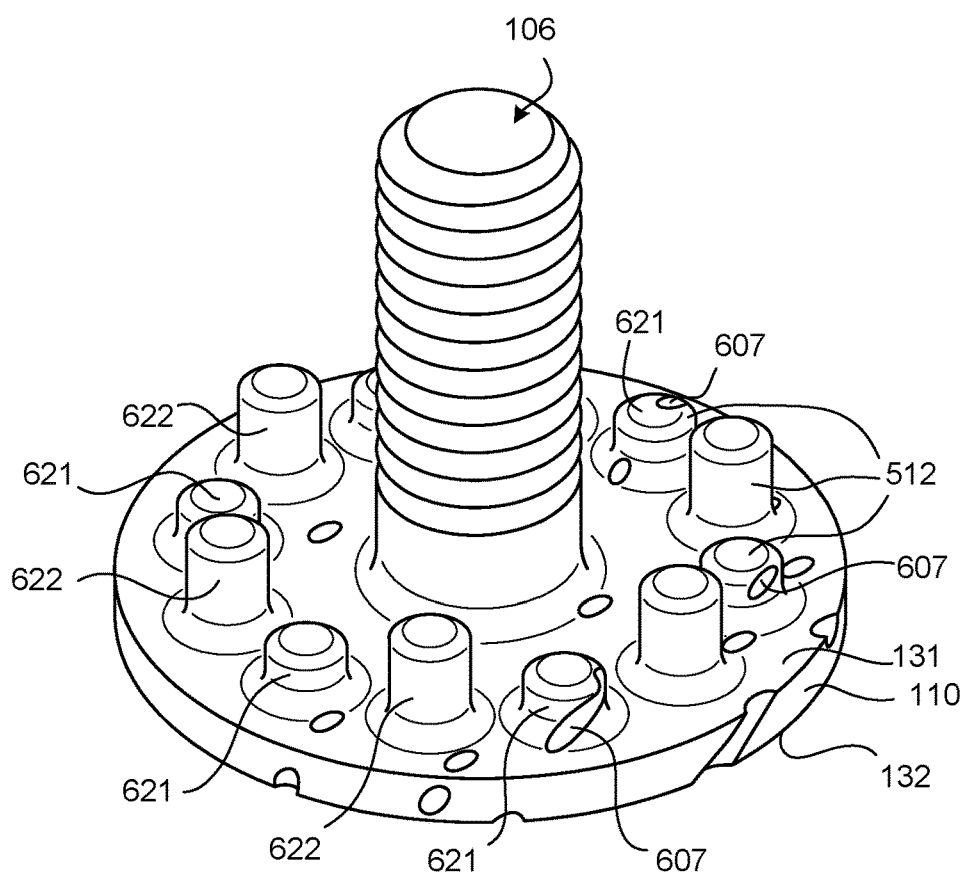
FIG. 12B is a perspective view of an attachment feature of a combustor panel, the combustor panel comprising a plurality of standoffs disposed around the attachment feature, the standoffs having a non-uniform height, in accordance with various embodiments.

In various embodiments, and with reference to FIGS. 12A and 12B, a plurality of standoffs 512 having different heights may be disposed around the attachment feature 106. That is, the plurality of standoffs 512 may include a first standoff 621 that has a first height and a second standoff 622 that has a second height, with the first height being different than the second height. As used in this context, the term "height" refers to a dimension measured parallel to the central longitudinal axis 125 of the attachment feature from the cold side 131 of the combustor panel 110. In various embodiments, the first standoff 621 may be one of a first grouping of standoffs of the plurality of standoffs 512 and the second standoff 622 may be one of a second grouping of standoffs of the plurality of standoffs 512. In various embodiments, the first height of the first standoff(s) 621 is less than the second height of the second standoff(s) 622. For example, the first height may be between about 25% and about 75% of the second height. In various embodiments, the first height is about 50% of the second height. As used in this context, the term "about" means plus or minus 5%.

In various embodiments, the plurality of standoffs 512 are distributed circumferentially around the attachment feature 106. In various embodiments, each standoff of the first grouping of standoffs is circumferentially adjacent respective second standoffs of the second grouping of standoffs and each second standoff of the second grouping of standoffs is circumferentially adjacent respective first standoffs of the first grouping of standoffs. Said differently, the pattern of standoffs 512 may alternate between first standoff 621 and second standoff 622.

In various embodiments, and with continued reference to FIGS. 12A-12B, a standoff effusion hole 607 is defined in at least one of the first standoffs 621. In various embodiments, each first standoff 621 defines at least one standoff effusion hole 607. The standoff effusion hole 607 is configured to deliver effusion cooling airflow from the annular cooling cavity 117 and the combustor chamber 102. In various embodiments, the standoff effusion holes 607 may only be defined in the first standoffs 621 and may not be defined in the second standoffs 622. Said differently, the first standoffs 621, having a smaller height and thus not necessarily configured to support a structural load (contrasted with the second standoffs 622 which may abut the combustor-facing side 142 of the combustor shell 104), may have the standoff effusion holes 607 formed therein while the second standoffs 622 do not have any standoff effusion holes (i.e., each second standoff 622 is comprised of solid material throughout its body).

Figure 13A:
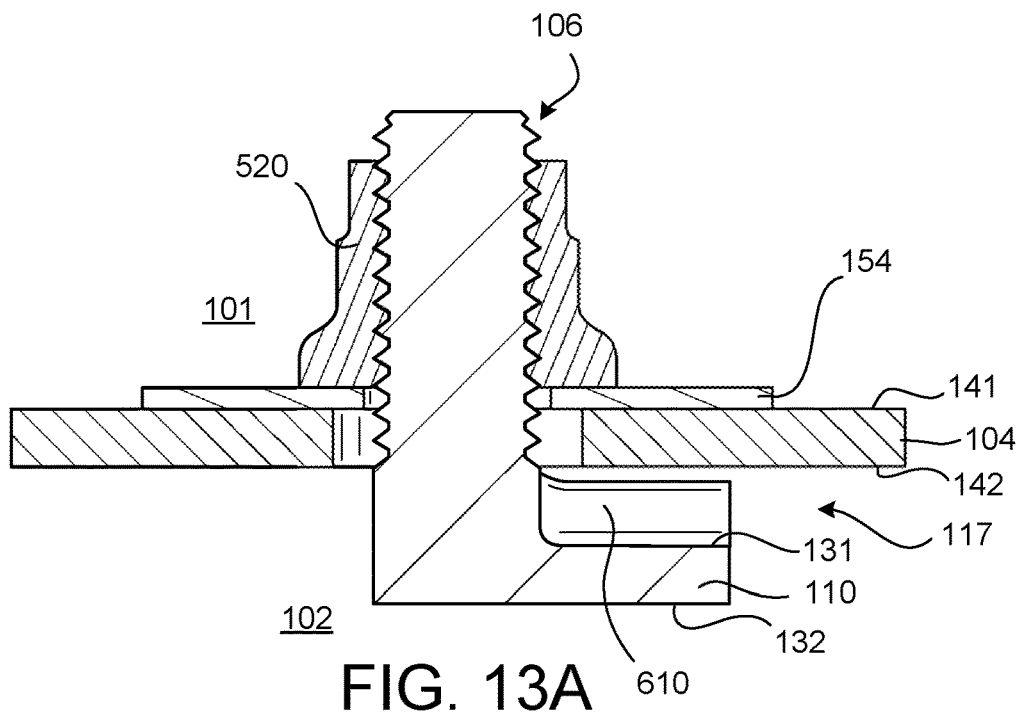
FIG. 13A is a cross-sectional view of an attachment feature of a combustor panel extending from a rail of the combustor panel through a combustor shell, in accordance with various embodiments.
Figure 13B:
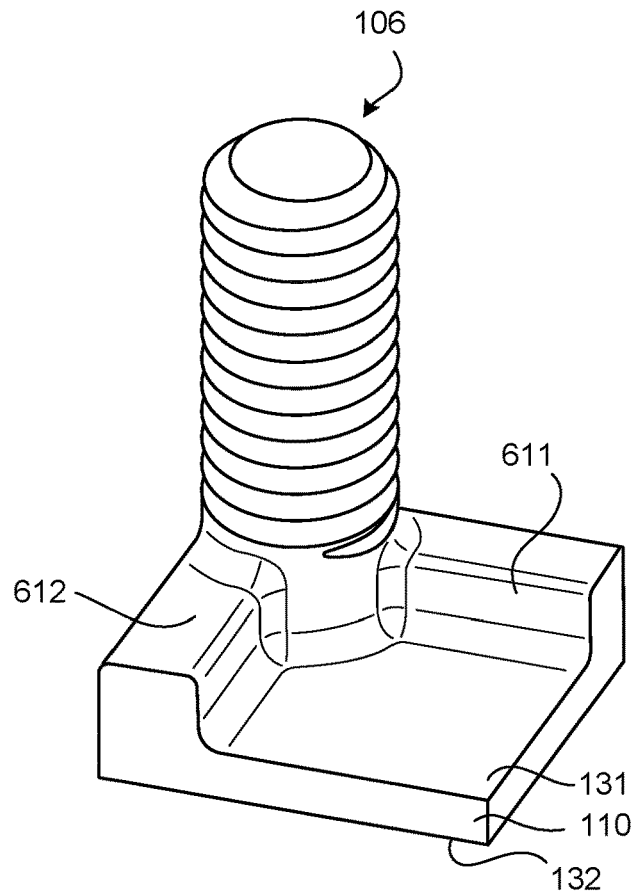
FIG. 13B is a perspective view of an attachment feature of a combustor panel extending from a rail of the combustor panel, in accordance with various embodiments.

In various embodiments, and with reference to FIGS. 13A and 13B, the combustor panel 110 may include a rail 610 extending from and at least partially along the cold side 131 of the combustor panel 110 and the attachment feature 106 may extend from the rail 610. Said differently, the attachment feature 106 may be positioned so as to extend from the rail(s) 610 formed on the cold side 131 of the combustor panel 110. The attachment feature 106 may be integrally formed with the rail 610 of the combustor panel 110.

In various embodiments, the rail 610 is a border rail that extends along a borer of the combustor panel. In various embodiments, the combustor panel 110 may include a plurality of attachment features and all of the attachment features are integrally formed with and extend from border rails 610 of the combustor panel 110. Said differently, the combustor panel 110 may be configured so that each and every attachment feature extends from a rail, such as a bordering rail, thus removing hot spots from the central portions of the combustor panel 110 that may otherwise form if the attachment features did not extend from border rails 610. In various embodiments, and with reference to FIG. 13B, the combustor panel 110 may include a first rail 611 and a second rail 612, with the first rail 611 and the second rail 612 intersecting at an intersection location and the attachment feature 106 extending from the intersection location. In various embodiments, the first and second rails 611, 612 are border rails and the intersection location is a corner of the combustor panel 110 and thus the attachment feature may extend from a corner border of the combustor panel 110.

In various embodiments, and with reference to FIGS. 12A, 12B, 13A, and 13B, the combustor panel 110 may include a border rail 610 extending along the cold side 131 of the combustor panel with a first attachment feature extending therefrom, and the combustor panel 110 may also include a second attachment feature having the plurality of standoffs 512 with non-uniform height. For example, the first attachment feature may be a border attachment feature and the second attachment feature may be centrally disposed on the combustor panel.

Figure 14A:
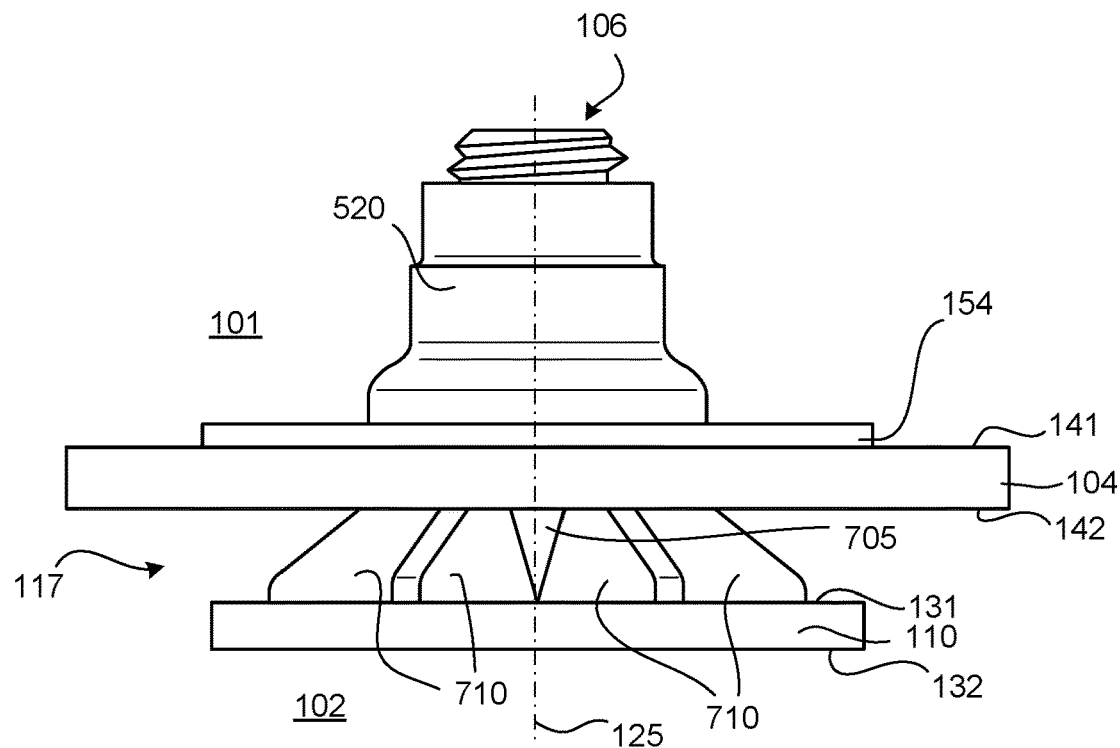
FIG. 14A is a side view of an attachment feature of a combustor panel extending through a combustor shell, with an interface/joint between the attachment feature and the combustor panel comprising a plurality of rails, in accordance with various embodiments.
Figure 14B:
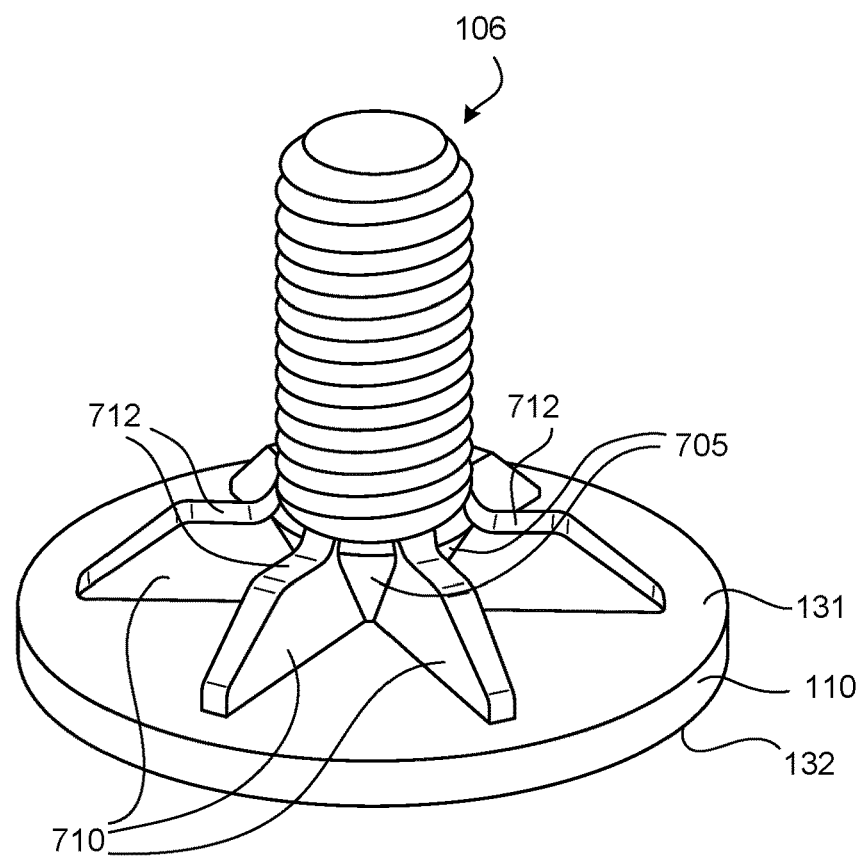
FIG. 14B is a perspective view of an attachment feature of a combustor panel, with an interface/joint between the attachment feature and the combustor panel comprising a plurality of rails, in accordance with various embodiments.
Figure 15A:
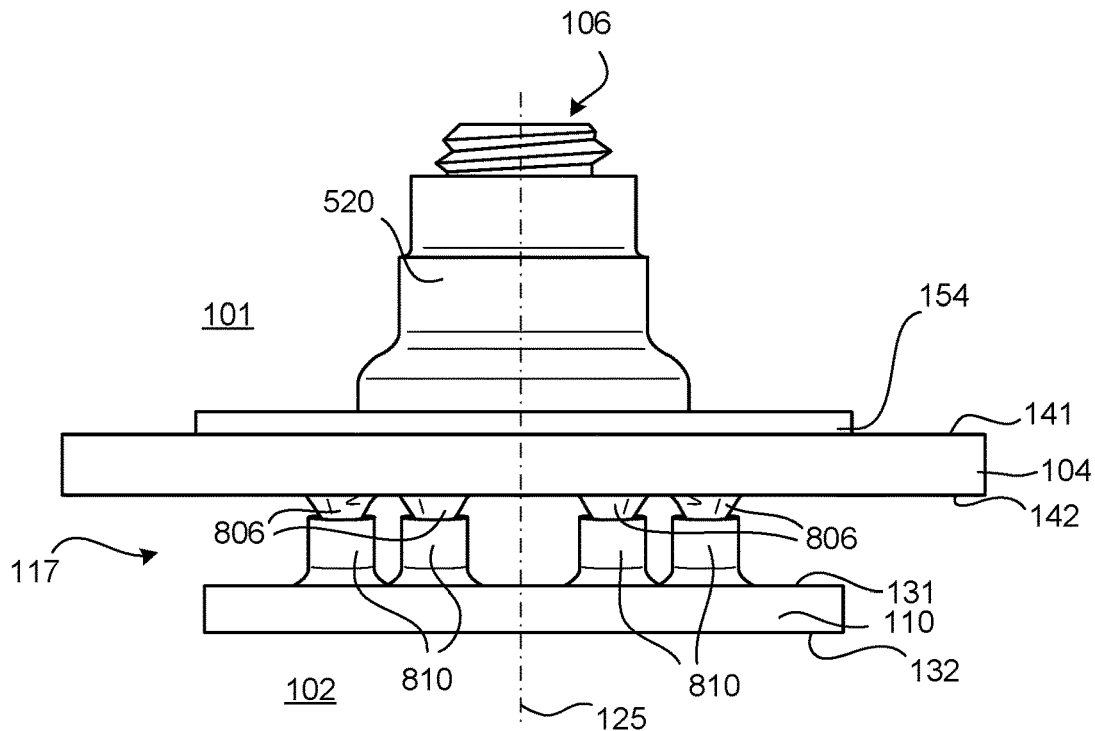
FIG. 15A is a side view of an attachment feature coupled to and extending from a combustor panel, the attachment feature extending through a combustor shell, in accordance with various embodiments.
Figure 15B:
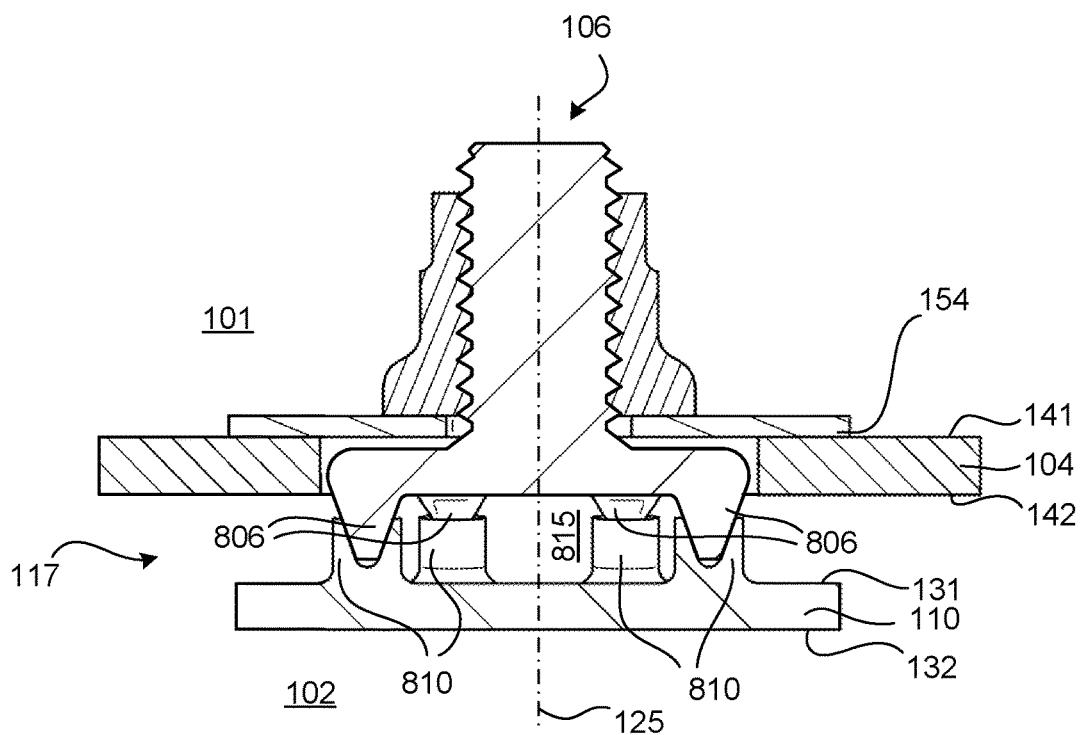
FIG. 15B is a cross-sectional view of an attachment feature coupled to an extending from a combustor panel, the attachment feature extending through a combustor shell, in accordance with various embodiments.
Figure 15C:
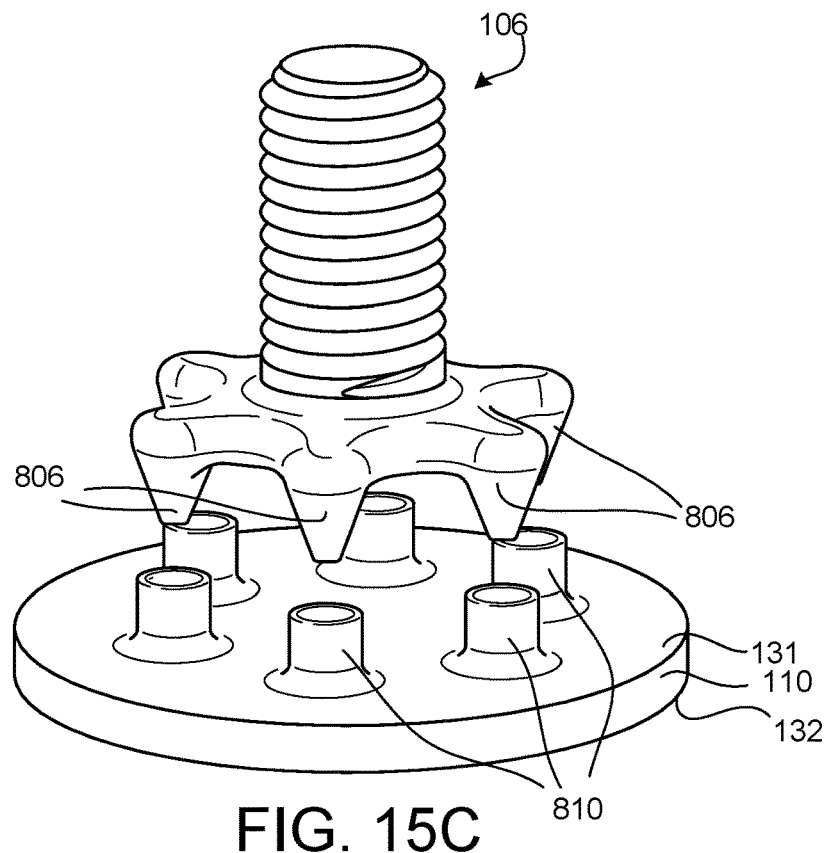
FIG. 15C is a perspective view of an attachment feature removed a distance from a combustor panel, in accordance with various embodiments.
Figure 15D:
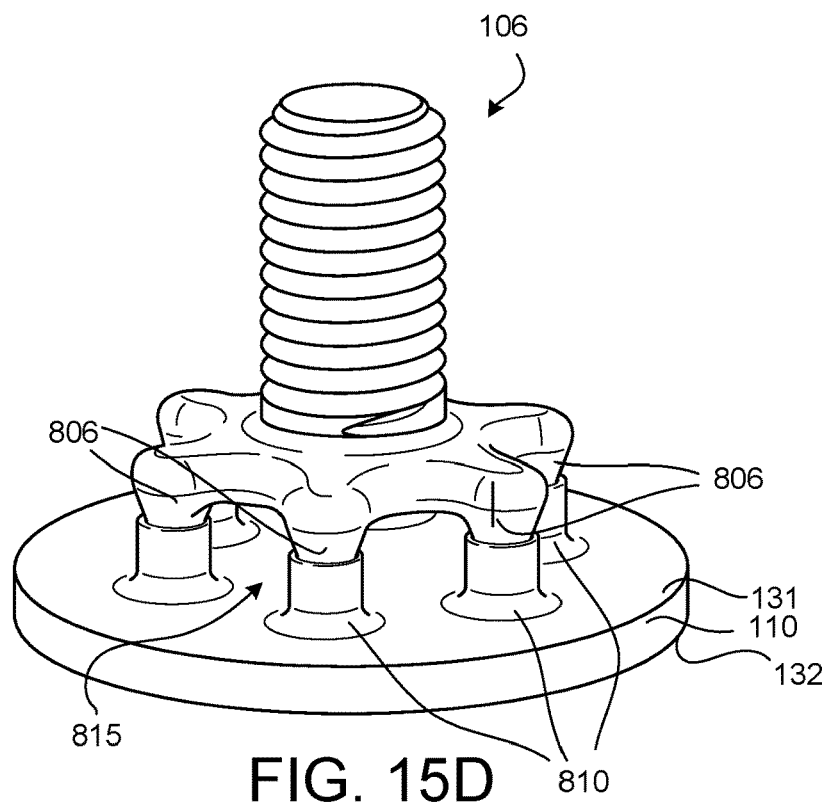
FIG. 15D is a perspective view of an attachment feature coupled to an extending from a combustor panel, in accordance with various embodiments.

In various embodiments, and with reference to FIGS. 14A and 14B, the attachment feature 106 includes a tip portion and a base portion. In various embodiments, the tip portion is configured to be disposed outward of a diffuser-facing side 141 of the combustor shell 104 and the base portion is configured to be disposed between the cold side 131 of the combustor panel 110 and the diffuser-facing side 141 of the combustor shell 104. In various embodiments, the base portion includes a plurality of base legs 710 extending from the cold side 131 of the combustor panel 110. The plurality of base legs 710 generally increase the surface area of the interface between the attachment feature 106 and the body of the combustor panel 110, thus improving convective heat transfer and inhibiting hot spot formation in the vicinity of the attachment feature 106.

The plurality of base legs 710 may be circumferentially distributed around the central longitudinal axis 125 of the attachment feature 106. In various embodiments, the plurality of base legs 710 are base rails. The plurality of base legs 710 may include an outward surface 712 configured to abut the combustor-facing side 142 of the combustor shell 104. Thus, the plurality of base legs 710 may provide a degree of structural support between the combustor shell 104 and the combustor panel 110 in the vicinity of the attachment feature 106. In various embodiments, the attachment feature 106 and the plurality of base legs 710 are integrally formed with the combustor panel 110.

In various embodiments, the plurality of base legs 710 extend from a tapered portion 705 of the base portion of the attachment feature 106. The tapered portion 705 may have a cross-sectional dimension that is less than a cross-sectional dimension of the tip portion of the attachment feature 106. Thus, according to various embodiments, the base portion of the attachment feature 106 has a section with reduced dimensions (i.e., the tapered portion 705), such as a cutaway or a cutback segment, thus reducing the footprint of the attachment feature where it extends from the cold side 131 of the combustor panel 110. This reduced footprint at the interface/location between the combustor panel 110 and the attachment feature 106 facilitates cooling to the area and tends to inhibit hot spot formation in the vicinity of the attachment feature 106. The plurality of base legs 710 may provide adequate structural support that would otherwise be lacking due to the reduced dimensions of the tapered portion 705. In various embodiments, the tapered portion 705 converges toward the central longitudinal axis 125 in a direction from the tip portion toward the base portion of the attachment feature 106. For example, the tapered portion 705 may have a conical shape.

In various embodiments, and with reference to FIGS. 15A, 15B, 15C, and 15D, a combustor arrangement is provided. The combustor may include combustor panel 110 and attachment feature 106. The combustor panel 110 may include a plurality of mounting interfaces 810 and the base portion of the attachment feature 106 may include a plurality of base legs 806. The plurality of base legs 806 may be coupled respectively to the plurality of mounting interfaces 810. In various embodiments, each base leg of the plurality of base legs 806 has a tapered protrusion that is received within a corresponding receptacle of the a respective mounting interface of the plurality of mounting interfaces 810 (see, for example, FIG. 15B). In various embodiments, the tapered protrusion of each base leg 806 may have conical geometry.

In various embodiments, the plurality of mounting interfaces 810 and the plurality of base legs 806 are circumferentially distributed around the central longitudinal axis 125 of the attachment feature 106. In various embodiments, and with reference to FIGS. 15A, 15B, and 15D, the central longitudinal axis 125 of the attachment feature 106 extends through a gap 815 defined between the base portion of the attachment feature 106 and the cold side 131 of the combustor panel 110. This gap 815 allows air flowing through the annular cooling cavity 117 to cool the combustor panel 110 and the attachment feature 106.

In various embodiments, the configurations, passages, structures, and features described herein are formed using various manufacturing techniques. For example, the various configurations, passages, structures, and features provided herein may be manufactured/formed via electrical discharge machining (EDM), additive manufacturing, and/or casting processes, among others.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A combustor panel comprising:
an attachment feature having
a central longitudinal axis and extending from a cold side of the combustor panel,
a tip portion, and
a base portion, wherein
the attachment feature is configured to extend through a combustor shell such that the tip portion is disposed outward of a diffuser facing side of the combustor shell, and the base portion is configured to be disposed between the cold side of the combustor panel and the diffuser-facing side of the combustor shell, the attachment feature defining:
a core passage extending from an inlet opening partially through the attachment feature substantially coaxially to the central longitudinal axis; and
an offshoot passage extending from the core passage to an outlet opening, wherein the outlet opening is defined on a peripheral surface of the base portion.

2. The combustor panel of claim 1, wherein the inlet opening is defined on the tip portion such that the core passage extends from the inlet opening and terminates within the attachment feature.

3. The combustor panel of claim 1, wherein the combustor panel comprises a plurality of standoffs surrounding the base portion of the attachment feature, wherein the outlet opening is oriented to deliver impingement cooling air to a volume defined between the standoffs and the attachment feature.

4. The combustor panel of claim 1, wherein the attachment feature is integrally formed with the combustor panel.

5. The combustor panel of claim 1, wherein the offshoot passage is one offshoot passage of a plurality of offshoot passages.

6. The combustor panel of claim 5, wherein the plurality of offshoot passages are circumferentially distributed and extend radially, relative to the central longitudinal axis of the attachment feature, from the core passage.

7. The combustor panel of claim 1, wherein the core passage comprises a closed, terminating end disposed within the base portion.

8. The combustor panel of claim 1, wherein the offshoot passage is substantially perpendicular to the central longitudinal axis of the attachment feature.

9. A combustor comprising:
a combustor shell comprising
   a diffuser-facing side and
   a combustor-lacing side opposite the diffuser-facing side the combustor shell defining a hole; and
a combustor panel comprising
   a cold side,
   a hot side opposite the cold side, and
   an attachment feature extending from the cold side, wherein
      the attachment feature comprises
         a central longitudinal axis,
         a tip portion,
         a base portion, and
         a peripheral surface, wherein
            the attachment feature extends into the hole defined by the combustor shell to couple the combustor panel to the combustor shell, wherein
            the tip portion is disposed outward of the diffuser-facing side of the combustor shell and the base portion is disposed between the cold side of the combustor panel and the diffuser-facing side of the combustor shell, wherein
            an annular cooling cavity is defined between the combustor-facing side of the combustor shell and the cold side of the combustor panel, wherein
      the attachment feature defines:
         a core passage extending from an inlet opening partially through the attachment feature substantially coaxially to the central longitudinal axis; and
         an offshoot passage extending from the core passage to an outlet opening, wherein
            the outlet opening is positioned to deliver cooling airflow to the annular cooling cavity.

10. The combustor of claim 9, wherein the outlet opening is defined on the peripheral surface of the attachment feature.

11. The combustor of claim 9, further comprising a nut engaged to the tip portion of the attachment feature and a washer disposed around the attachment feature between the nut and the diffuser-facing side of the combustor shell, wherein the outlet opening of the offshoot passage is inward of the washer.

12. The combustor of claim 11, wherein the combustor panel comprises a plurality of standoffs surrounding the base portion of the attachment feature, wherein the outlet opening is oriented to deliver impingement cooling air to a volume defined between the standoffs and the attachment feature.

13. The combustor of claim 9, wherein the hole defined in the combustor shell has an elongated shape.

* * * * *